United States Patent
Kwak et al.

(10) Patent No.: US 11,582,626 B2
(45) Date of Patent: Feb. 14, 2023

(54) METHOD AND DEVICE FOR SUPPORTING BEAM-BASED COOPERATIVE COMMUNICATION IN WIRELESS COMMUNICATION SYSTEM

(71) Applicant: Samsung Electronics Co., Ltd., Gyeonggi-do (KR)

(72) Inventors: Young-woo Kwak, Gyeonggi-do (KR); Hoon-dong Noh, Gyeonggi-do (KR); Cheol-kyu Shin, Gyeongg-do (KR)

(73) Assignee: Samsung Electronics Co., Ltd

( * ) Notice: Subject to any disclaimer, the term of this patent is extended or adjusted under 35 U.S.C. 154(b) by 128 days.

(21) Appl. No.: 16/756,312

(22) PCT Filed: Oct. 17, 2018

(86) PCT No.: PCT/KR2018/012218
§ 371 (c)(1),
(2) Date: Apr. 15, 2020

(87) PCT Pub. No.: WO2019/078593
PCT Pub. Date: Apr. 25, 2019

(65) Prior Publication Data
US 2020/0245166 A1    Jul. 30, 2020

(30) Foreign Application Priority Data

Oct. 17, 2017  (KR) ........................ 10-2017-0134820
Dec. 14, 2017  (KR) ........................ 10-2017-0172650
May 4, 2018    (KR) ........................ 10-2018-0052150

(51) Int. Cl.
*H04L 1/00*     (2006.01)
*H04W 24/08*   (2009.01)
(Continued)

(52) U.S. Cl.
CPC .......... *H04W 24/08* (2013.01); *H04B 7/0617* (2013.01); *H04B 17/318* (2015.01); *H04L 5/0048* (2013.01)

(58) Field of Classification Search
CPC ... H04W 24/08; H04B 17/318; H04B 7/0617; H04L 5/0048
(Continued)

(56) References Cited

U.S. PATENT DOCUMENTS

2014/0126668 A1    5/2014   Kim et al.
2016/0337056 A1   11/2016   Frenne et al.
(Continued)

FOREIGN PATENT DOCUMENTS

WO    WO 2017/099830    6/2017

OTHER PUBLICATIONS

Huawei et al., "General Framework for CSI Acquisition and Beam Management", R1-1712226, 3GPP TSG RAN WG1 Meeting #90, Aug. 21-25, 2017, 10 pages.
(Continued)

*Primary Examiner* — Zewdu A Kassa
(74) *Attorney, Agent, or Firm* — The Farrell Law Firm, P.C.

(57) ABSTRACT

Provided are a method and apparatus for supporting beam-based cooperative communication for smoothly providing a service in a wireless communication system. The method, performed by a terminal, of supporting beam-based cooperative communication includes: receiving, from a base station, configuration information for measuring quality of a beam; receiving first reference signals regarding desired channels respectively corresponding to a plurality of transmission beams received from the base station, and second reference signals regarding interference channels respectively corresponding to a plurality of transmission beams
(Continued)

that interfere with the plurality of transmission beams received from the base station; and measuring quality of a beam regarding the plurality of transmission beams received from the base station, based on the configuration information, the first reference signals, and the second reference signals.

12 Claims, 31 Drawing Sheets

(51) Int. Cl.
 *H04B 7/06* (2006.01)
 *H04B 17/318* (2015.01)
 *H04L 5/00* (2006.01)
(58) Field of Classification Search
 USPC ........ 375/252, 247, 242, 240, 219, 295, 316
 See application file for complete search history.

(56) References Cited

U.S. PATENT DOCUMENTS

2017/0207845 A1 7/2017 Moon et al.
2019/0305838 A1* 10/2019 Davydov ............. H04B 7/0695
2020/0068576 A1* 2/2020 Li ....................... H04W 72/082

OTHER PUBLICATIONS

International Search Report dated Jan. 25, 2019 issued in counterpart application No. PCT/KR2018/012218, 22 pages.
Korean Office Action dated Jul. 29, 2022 issued in counterpart application No. 10-2018-0052150, 10 pages.

* cited by examiner

METHOD AND DEVICE FOR SUPPORTING BEAM-BASED COOPERATIVE COMMUNICATION IN WIRELESS COMMUNICATION SYSTEM

PRIORITY

This application is a National Phase Entry of PCT International Application No. PCT/KR2018/012218 which was filed on Oct. 17, 2018, and claims priority to Korean Patent Application Nos. 10-2017-0134820, 10-2017-0172650 and 10-2018-0052150, which were filed on Oct. 17, 2017, Dec. 14, 2017 and May 4, 2018, respectively, the content of each of which is incorporated herein by reference.

TECHNICAL FIELD

The present disclosure relates to a wireless communication system, and more particularly, to a method and apparatus for supporting beam-based cooperative communication for smoothly providing a service in a wireless communication system.

BACKGROUND ART

To meet the increase in demand for wireless data traffic after the commercialization of $4^{th}$ generation (4G) communication systems, considerable efforts have been made to develop pre-$5^{th}$ generation (5G) communication systems or 5G communication systems. This is one reason why '5G communication systems' or 'pre-5G communication systems' are called 'beyond 4G network communication systems' or 'post Long-Term Evolution (LTE) systems.' In order to achieve a high data transmission rate, 5G communication systems are being developed to be implemented in a super-high-frequency band (millimeter wave (mmWave)), e.g., a band of 60 GHz. In order to reduce the path loss of radio waves in such a super-high-frequency band and to increase a transmission distance of radio waves in 5G communication systems, various technologies have been discussed and are being studied, for example: beamforming, massive multiple-input multiple-output (MIMO), Full Dimensional MIMO (FD-MIMO), array antennas, analog beam-forming, and large-scale antennas. In order to improve system networks for 5G communication systems, various technologies have been developed, e.g., evolved small cells, advanced small cells, cloud radio access networks (Cloud-RAN), ultra-dense networks, Device-to-Device communication (D2D), wireless backhaul, moving networks, cooperative communication, Coordinated Multi-Points (CoMP), and interference cancellation. Also, for 5G communication systems, other technologies have been developed, e.g., hybrid frequency-shift keying (FSK) and quadrature amplitude modulation (QAM) (FQAM) and Sliding Window Superposition Coding (SWSC), which are Advanced Coding Modulation (ACM) schemes, and Filter Bank Multi Carrier (FBMC), non-orthogonal multiple access (NOMA) and sparse code multiple access (SCMA), which are advanced access schemes.

The Internet has evolved from a human-based connection network, where humans create and consume information, to the Internet of Things (IoT), where distributed components, such as objects, exchange information with each other to process the information. Internet of Everything (IoE) technology is emerging, in which technology related to the IoT is combined with, for example, technology for processing big data through connection with a cloud server. In order to implement the IoT, various technological components are required, such as sensing technology, wired/wireless communication and network infrastructures, service interface technology, security technology, etc. In recent years, technologies including a sensor network for connecting objects, Machine to Machine (M2M) communication, Machine Type Communication (MTC), etc. have been studied. In the IoT environment, intelligent Internet Technology (IT) services may be provided to collect and analyze data obtained from objects connected to each other to create new value in human life. As existing information technology (IT) techniques and various industries converge and are combined with each other, the IoT may be applied to various fields, such as smart homes, smart buildings, smart cities, smart cars or connected cars, smart grids, health care, smart home appliances, high-quality medical services, etc.

Various attempts are being made to apply 5G communication systems to the IoT network. For example, technologies related to sensor networks, M2M communication, MTC, etc., are being implemented by using 5G communication technology including beam-forming, MIMO, array antennas, etc. The application of Cloud-RAN as a big data processing technology described above may be an example of convergence of 5G communication technology and IoT technology.

As described above, various services may be provided due to the development of wireless communication systems, and thus there is a need for methods of smoothly providing such services.

DESCRIPTION OF EMBODIMENTS

Technical Problem

Provided are a method and apparatus for supporting beam-based cooperative communication for smoothly providing a service in a wireless communication system.

Solution to Problem

According to an embodiment, a method, performed by a terminal, of supporting beam-based cooperative communication includes: receiving, from a base station, configuration information for measuring quality of a beam; receiving first reference signals regarding desired channels respectively corresponding to a plurality of transmission beams received from the base station, and second reference signals regarding interference channels respectively corresponding to a plurality of transmission beams that interfere with the plurality of transmission beams received from the base station; and measuring quality of a beam regarding the plurality of transmission beams received from the base station, based on the configuration information, the first reference signals, and the second reference signals.

According to an embodiment, a method, performed by a base station, of supporting beam-based cooperative communication includes: transmitting, to a terminal, configuration information for measuring quality of a beam; transmitting, to the terminal, reference signals by using a plurality of transmission beams; and receiving, from the terminal, feedback information regarding the reference signals.

According to an embodiment, a terminal for supporting beam-based cooperative communication includes: a transceiver; at least one memory storing a program for supporting beam-based cooperative communication; and at least one processor configured to execute the program to receive, from a base station, configuration information for measuring quality of a beam, receive first reference signals regarding desired channels respectively corresponding to a plurality of transmission beams received from the base station and second reference signals regarding interference channels respectively corresponding to a plurality of transmission beams interfering with the plurality of transmission beams received from the base station, and measuring quality of a beam regarding the plurality of transmission beams received from the base station, based on the configuration information, the first reference signals, and the second reference signals.

According to an embodiment, a base station for supporting beam-based cooperative communication includes: a transceiver; at least one memory storing a program for supporting beam-based cooperative communication; and at least one processor is configured to execute the program to transmit, to a terminal, configuration information for measuring quality of a beam, transmit, to the terminal, reference signals by using a plurality of transmission beams, and receive, from the terminal, feedback information regarding the reference signals.

ADVANTAGEOUS EFFECTS OF DISCLOSURE

According to the present disclosure, a service may be smoothly provided in a wireless communication system.

BEST MODE

Figure 1:
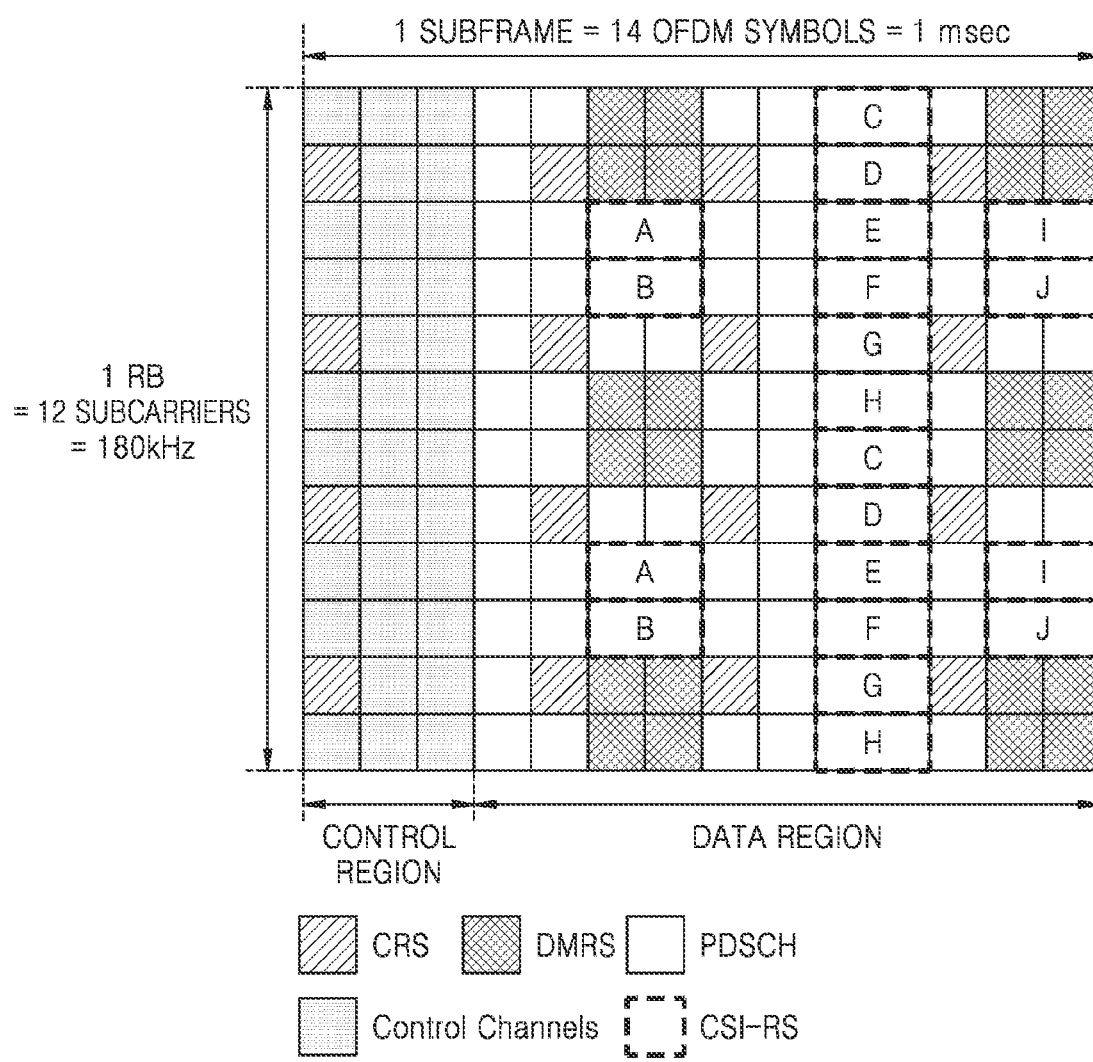
FIG. 1 is a diagram showing a configuration of a time-frequency domain that is a downlink radio resource region of a long-term evolution (LTE), long-term evolution advanced (LTE-A), or similar system.

According to an embodiment, a method, performed by a terminal, of supporting beam-based cooperative communication includes: receiving, from a base station, configuration information for measuring quality of a beam; receiving first reference signals regarding desired channels respectively corresponding to a plurality of transmission beams received from the base station, and second reference signals regarding interference channels respectively corresponding to a plurality of transmission beams that interfere with the plurality of transmission beams received from the base station; and measuring quality of a beam regarding the plurality of transmission beams received from the base station, based on the configuration information, the first reference signals, and the second reference signals.

According to an embodiment, the measuring of the quality of the beam regarding the plurality of transmission beams received from the base station may include measuring the quality of the beam, based on a ratio of reception strength of the first reference signals to reception strength of the second reference signals.

According to an embodiment, the receiving of the first reference signals and the second reference signals may include receiving the first reference signals and the second reference signals at the same time point.

According to an embodiment, the measuring of the quality of the beam regarding the plurality of transmission beams received from the base station may include, when the number of first reference signals and the number of second reference signals are different, measuring the quality of the beam based on reception strength of only a received signal, measuring the quality of the beam while ignoring some reference signals that are not received, or measuring the quality of the beam based on the larger number of reference signals.

According to an embodiment the receiving of the first reference signals and the second reference signals may include receiving the first reference signals and the second reference signals at different time points, and the measuring of the quality of the beam regarding the plurality of transmission beams received from the base station may include measuring each of reception strength of the first reference signals and reception strength of the second reference signals, which are received at the different time points, and measuring the quality of the beam regarding the plurality of transmission beams received from the base station by combining the measured signal strengths.

According to an embodiment, the receiving of the first reference signals and the second reference signals may include receiving the first reference signals and the second reference signals, which are received at the different time points, by using the same reception beam.

According to an embodiment, the method may further include: receiving feedback configuration information from the base station; generating feedback information based on the measured quality of the beam and the feedback configuration information; and transmitting the feedback information to the base station.

According to an embodiment, a method, performed by a base station, of supporting beam-based cooperative communication includes: transmitting, to a terminal, configuration information for measuring quality of a beam; transmitting, to the terminal, reference signals by using a plurality of transmission beams; and receiving, from the terminal, feedback information regarding the reference signals.

According to an embodiment, the method may further include transmitting, to the terminal, feedback configuration information, wherein the receiving of the feedback information regarding the reference signals may include receiving the feedback information based on the feedback configuration information.

According to an embodiment, the method may further include transmitting and receiving transmission beam-related information to and from a base station that transmits a transmission beam interfering with the plurality of transmission beams transmitted by the base station.

According to an embodiment, a terminal for supporting beam-based cooperative communication includes: a transceiver; at least one memory storing a program for supporting beam-based cooperative communication; and at least one processor configured to execute the program to receive, from a base station, configuration information for measuring quality of a beam, receive first reference signals regarding desired channels respectively corresponding to a plurality of transmission beams received from the base station and second reference signals regarding interference channels respectively corresponding to a plurality of transmission beams interfering with the plurality of transmission beams received from the base station, and measuring quality of a beam regarding the plurality of transmission beams received from the base station, based on the configuration information, the first reference signals, and the second reference signals.

According to an embodiment, the at least one processor may be further configured to measure the quality of the beam, based on a ratio of reception strength of the first reference signals to reception strength of the second reference signals.

According to an embodiment, the at least one processor may be further configured to receive the first reference signals and the second reference signals at the same time point.

According to an embodiment, the at least one processor may be further configured to when the number of first reference signals and the number of second reference signals are different, measure the quality of the beam based on reception strength of only a received signal, measure the quality of the beam while ignoring some reference signals that are not received, or measure the quality of the beam based on the larger number of reference signals.

According to an embodiment, the at least one processor may be further configured to receive the first reference signals and the second reference signals at different time points by using the same reception beam, measure each of reception strength of the first reference signals and reception strength of the second reference signals, which are received at the different time points, and measure the quality of the beam regarding the plurality of transmission beams received from the base station by combining the measured reception strengths.

According to an embodiment, the at least one processor may be further configured to receive the first reference signals and the second reference signals, which are received at the different time points, by using the same reception beam.

According to an embodiment, the at least one processor may be further configured to generate feedback information based on the measured quality of the beam and the feedback configuration information and transmit the feedback information to the base station.

According to an embodiment, a base station for supporting beam-based cooperative communication includes: a transceiver; at least one memory storing a program for supporting beam-based cooperative communication; and at least one processor is configured to execute the program to transmit, to a terminal, configuration information for measuring quality of a beam, transmit, to the terminal, reference signals by using a plurality of transmission beams, and receive, from the terminal, feedback information regarding the reference signals.

According to an embodiment, the at least one processor may be further configured to transmit, to the terminal, feedback configuration information and receive the feedback information based on the feedback configuration information.

According to an embodiment, the at least one processor may be further configured to transmit and receive transmission beam-related information to and from a base station that transmits a transmission beam interfering with the plurality of transmission beams transmitted by the base station.

MODE OF DISCLOSURE

Hereinafter, embodiments of the present disclosure will be described with reference to accompanying drawings.

In describing the embodiments, descriptions of technical contents that are well known in the technical field to which the present disclosure belongs and are not directly related to the present disclosure will be omitted. By omitting the unnecessary description, the gist of the present disclosure may be more clearly conveyed without obscuring the subject matter.

For the same reasons, components may be exaggerated, omitted, or schematically illustrated in drawings for clarity. Also, the size of each component does not completely reflect the actual size. In the drawings, like or corresponding reference numerals denote like elements.

Advantages and features of the present disclosure and methods of accomplishing the same may be understood more readily by reference to the following detailed description of the embodiments and the accompanying drawings. In this regard, the embodiments of the present disclosure may have different forms and should not be construed as being limited to the descriptions set forth herein. Rather, these embodiments are provided so that the present disclosure will be thorough and complete and will fully convey the concept of the disclosure to one of ordinary skill in the art, and the present disclosure will only be defined by the appended claims. Throughout the specification, like reference numerals denote like elements.

Here, it will be understood that combinations of blocks in flowcharts or process flow diagrams may be performed by computer program instructions. Because these computer program instructions may be loaded into a processor of a general purpose computer, a special purpose computer, or another programmable data processing apparatus, the instructions, which are performed by a processor of a computer or another programmable data processing apparatus, create units for performing functions described in the flowchart block(s). The computer program instructions may be stored in a computer-usable or computer-readable memory capable of directing a computer or another programmable data processing apparatus to implement a function in a particular manner, and thus the instructions stored in the computer-usable or computer-readable memory may also be capable of producing manufacturing items containing instruction units for performing the functions described in the flowchart block(s). The computer program instructions may also be loaded into a computer or another programmable data processing apparatus, and thus, instructions for operating the computer or the other programmable data processing apparatus by generating a computer-executed process when a series of operations are performed in the computer or the other programmable data processing apparatus may provide operations for performing the functions described in the flowchart block(s).

In addition, each block may represent a portion of a module, segment, or code that includes one or more executable instructions for executing specified logical function(s). It should also be noted that in some alternative implementations, functions mentioned in blocks may occur out of order. For example, two blocks illustrated successively may actually be executed substantially concurrently, or the blocks may sometimes be performed in a reverse order according to the corresponding function.

Here, the term "unit" in the embodiments means a software component or hardware component such as a Field-Programmable Gate Array (FPGA) or an Application-Specific Integrated Circuit (ASIC), and performs a specific function. However, the term "unit" is not limited to software or hardware. The "unit" may be formed so as to be in an addressable storage medium, or may be formed so as to operate one or more processors. Thus, for example, the term "unit" may refer to components such as software components, object-oriented software components, class components, and task components, and may include processes, functions, attributes, procedures, subroutines, segments of program code, drivers, firmware, micro codes, circuits, data, a database, data structures, tables, arrays, or variables. A function provided by the components and "units" may be associated with the smaller number of components and "units", or may be divided into additional components and "units". Furthermore, the components and "units" may be embodied to reproduce one or more central processing units (CPUs) in a device or security multimedia card. Also, in the embodiments, the "unit" may include at least one processor.

Wireless communication systems have been developed from wireless communication systems providing voice centered services in the early stage toward broadband wireless communication systems providing high-speed, high-quality packet data services, like communication standards of high speed packet access (HSPA), long term evolution (LTE or evolved universal terrestrial radio access (E-UTRA)), LTE-advanced (LTE-A), and LTE-Pro of the 3GPP, high rate packet data (HRPD) and ultra mobile broadband (UMB) of 3GPP2, IEEE 802.16e or the like. Also, a $5^{th}$ generation (5G) or new radio (NR) communication standards are being developed with 5G wireless communication systems.

As a representative example of the broadband wireless communication system, the LTE system has adopted an orthogonal frequency division multiplexing (OFDM) scheme in a downlink (DL) and has adopted a single carrier frequency division multiple access (SC-FDMA) scheme in an uplink (UL). The UL refers to a radio link through which a terminal (a user equipment (UE) or a mobile station (MS)) transmits data or a control signal to a base station (BS) (e.g., eNode B), and the DL refers to a radio link through which a BS transmits data or a control signal to a terminal. In such a multiple access scheme, data or control information of each user is classified by generally assigning and operating the data or control information such that time-frequency resources for transmitting data or control information for each user do not overlap each other, that is, such that orthogonality is established.

An LTE system employs a hybrid automatic repeat request (HARQ) scheme in which a physical layer retransmits data when a decoding failure occurs in initial transmission. In the HARQ scheme, when a receiver fails to accurately decode data, the receiver transmits information (Negative Acknowledgment (NACK)) indicating the decoding failure to the transmitter so that the transmitter may retransmit the corresponding data in the physical layer. The receiver combines the data retransmitted by the transmitter with the data whose previous decoding had failed so as to improve data reception performance. In addition, when the receiver accurately decodes the data, information (acknowledgment (ACK)) indicating successful decoding is transmitted to the transmitter so that the transmitter may transmit new data.

Terms used below are defined in consideration of functions in the present disclosure, and may have different meanings according to an intention of a user or operator, customs, or the like. Thus, the terms should be defined based on the description throughout the specification. Hereinafter, a base station is an entity that assigns resources of a terminal, and may be at least one of a gNode B (gNB), an eNode B (eNB), a Node B (NB), a base station (BS), a wireless access unit, a BS controller, or a node on a network. Examples of a terminal may include user equipment (UE), a mobile station (MS), a cellular phone, a smartphone, a computer, and a multimedia system capable of performing a communication function. In the present disclosure, a downlink (DL) is a wireless transmission path of a signal transmitted from a base station to a terminal, and an uplink (UL) is a wireless transmission path of a signal transmitted from a terminal to a base station. Also, hereinbelow, one or more embodiments of the present disclosure will be described as an example of an LTE or LTE-A system, but the one or more embodiments may also be applied to other communication systems having a similar technical background or channel form. For example, 5G mobile communication technology (5G or NR) developed after LTE-A may be included. Also, it will be understood by one of ordinary skill in the art that embodiments of the present disclosure may be applied to other communication systems through some modifications without departing from the scope of the present disclosure.

Terms such as a physical channel and a signal in a general LTE or LTE-A system may be used to describe a method and apparatus proposed in the present disclosure. However, the content of the present disclosure may be applied to a wireless communication system other than the LTE and LTE-A system.

Also, the content of the present disclosure may be applied to frequency division duplex (FDD) or time division duplex (TDD) systems.

Hereinafter, physical layer signaling in the present disclosure denotes a method of transmitting a signal from a base station to a terminal by using a DL control channel of a physical layer or from a terminal to a base station by using an UL control channel of a physical layer, and may be referred to as L1 signaling or PHY signaling.

Hereinafter, higher signaling or higher layer signaling in the present disclosure denotes a method of transmitting a signal from a base station to a terminal by using a DL data channel of a physical layer or from a terminal to a base station by using an UL data channel of a physical layer, and may be referred to as radio resource control (RRC) signaling, L2 signaling, packet data convergence protocol (PDCP) signaling, or medium access control (MAC) control element (CE).

Hereinafter, TPMI in the present disclosure denotes a transmit precoding matrix indicator or transmit precoding matrix information, and similarly, may be represented by beamforming vector information or beam direction information.

Hereinafter, UL downlink control information (DCI) or UL-related DCI in the present disclosure denotes physical layer control signaling (L1 control) including pieces of information required for UL transmission, such as UL resource configuration information like UL grant, resource configuration type information UL power control information, cyclic shift or orthogonal cover code (OCC) of an UL reference signal, CSI request, sounding reference signal (SRS) request, modulation coding scheme (MCS) information, and UL precoding information field.

FIG. 1 is a diagram showing a configuration of a time-frequency domain that is a downlink radio resource region of a LTE, LTE-A, or similar system.

Referring to FIG. 1, a time axis of a radio resource region include one subframe including 14 OFDM symbols, and a frequency axis includes one resource block (RB) including 12 subcarriers. Accordingly, the radio resource region may include total 168 unique frequency and time positions. In the LTE and LTE-A systems, each unique frequency and time position is referred to as a resource element (RE).

Referring to FIG. 1, following signals may be transmitted in the radio resource region.

1) Cell specific RS (CRS): Reference signal periodically transmitted for all terminals in one cell and may be commonly used by a plurality of terminals.

2) Demodulation reference signal (DMRS): Reference signal transmitted for a specific terminal and is transmitted to the terminal only when data is transmitted. DMRS may include total 8 DMRS ports. In the LTE and LTE-A systems, a port 7 to a port 14 correspond to the DMRS ports and maintain orthogonality such as not to interfere with each other by using code divisional multiplexing (CDM) or frequency divisional multiplexing (FDM).

3) Physical downlink shared channel (PDSCH): Data channel transmitted via downlink, is used by a base station to transmit traffic to a terminal, and is transmitted by using an RE where a reference signal is not transmitted in a data region of the radio resource region.

4) Channel state information reference signal (CSI-RS): Reference signal transmitted for terminals in one cell and is used to measure a channel state. A plurality of CSI-RSs may be transmitted to one cell.

5) Other control channels (physical hybrid ARQ indicator channel (PHICH), physical control format indicator channel (PCFICH), and physical downlink control channel (PDCCH)): Control information required for a terminal to receive PDSCH is provided or acknowledgement (ACK)/negative acknowledgement (NACK) for operating HARQ regarding data transmission of uplink is transmitted, and are transmitted by using a control region of the radio resource region.

In the LTE-A system, muting may be configured such that CSI-RS transmitted by another base station is received by terminals of a corresponding cell without interference. The muting may be applied at a position where the CSI-RS is transmittable and the terminal may receive a traffic signal by skipping a corresponding radio resource. In the LTE-A system, the muting may be referred to as zero-power CSI-RS. This is because the muting is applied at the position of CSI-RS due to its characteristic and transmit power is not transmitted.

Referring to FIG. 1, CSI-RS may be transmitted by using some of positions indicated by A through J, based on the number of antennas that transmit CSI-RS. Also, the muting may be applied to some of the positions indicated by A through J. In particular, CSI-RS may be transmitted via 2, 4, or 8 REs, based on the number of antenna ports. For example, when the number of antenna ports is 2, CSI-RS may be transmitted via half of a specific pattern in FIG. 1, and when the number of antenna ports is 4, CSI-RS may be transmitted via the entire specific pattern. Also, when the number of antenna ports is 8, CSI-RS may be transmitted by using two patterns.

In comparison, the muting is always applied in one pattern unit. In other words, the muting may be applied to a plurality of patterns, but when a position does not overlap with CSI-RS, is unable to be applied to a part of one pattern. However, when the position of CSI-RS and the position of the muting overlap each other, the muting may be applicable to a part of one pattern. For example, when CSI-RS for two antenna ports is transmitted, the CSI-RS may transmit signals of antenna ports from two REs connected in the time axis, wherein signals of the antenna ports may be distinguished by orthogonal codes. Also, when CSI-RS for four antenna ports is transmitted, signals of two added antenna ports may be transmitted via the same method by further using two REs in addition to CSI-RS for the two antenna ports. The same manner is applied when CSI-RS for eight antenna ports is transmitted. In the case of CSI-RS supporting 12 or 16 antenna ports, three CSI-RS transmission positions for existing four antenna ports may be combined or two CSI-RS transmission positions for eight antenna ports may be combined.

Also, CSI-interference management (IM) (or interference measurement resource (IMR)) may be assigned to the terminal together with CSI-RS, and a resource of CSI-IM may have the same structure and position as a resource of CSI-RS supporting 4 ports. CSI-IM is a resource for accurately measuring, by a terminal that receives data from at least one base station, interference from an adjacent base station. For example, when an amount of interference when the adjacent base station transmits data and an amount of interference when the adjacent base station does not transmit data are measured, the base station may configure CSI-RS and two CSI-IM resources. Here, the amount of interference of the adjacent base station may be effectively measured as one CSI-IM allows the adjacent base station to always transmit a signal and the other CSI-IM allows the adjacent base station not to always transmit a signal.

Table 1 shows a radio resource control (RRC) field configuring CSI-RS configuration.

TABLE 1

| CSI-RS config | CSI-IM config | CQI report report config | Etc |
|---|---|---|---|
| No. antenna ports Resource config Time and frequency position in a subframe Subframe config Periodicity and subframe offset QcI-CRS-info (QCL Type B) CRS information for CoMP | Resource config Time and frequency position in a subframe Subframe config Periodicity and subframe offset | Periodic Mode, resource, periodicity, offset . . . Aperiodic Mode.. PMI/RI report RI reference CSI process SubframePattern | $P_C$ Codebook subset restriction |

Referring to Table 1, configuration for reporting a channel state based on periodic CSI-RS in CSI process may be classified into four types. CSI-RS config is for configuring frequency and time positions of a CSI-RS RE. Here, the number of ports of corresponding CSI-RS may be configured by configuring the number of antennas. Resource config configures a position of RE in RB, and subframe config configures a period and offset of a subframe.

Table 2 is a table for configuring resource config and subframe config supported by current LTE.

TABLE 2

| | | Number of CSI reference signals configured | | | | | |
|---|---|---|---|---|---|---|---|
| CSI reference signal | | 1 or 2 | | 4 | | 8 | |
| | configuration | (k', l') | $n_s$ mod 2 | (k', l') | $n_s$ mod 2 | (k', l') | $n_s$ mod 2 |
| Frame structure type 1 and 2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| Frame structure type 2 only | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |

TABLE 2-continued

| | | |
|---|---|---|
| 29 | (2, 1) | 1 |
| 30 | (1, 1) | 1 |
| 31 | (0, 1) | 1 |

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-4 | 10 | $I_{CSI-RS} - 5$ |
| 15-34 | 20 | $I_{CSI-RS} - 15$ |
| 35-74 | 40 | $I_{CSI-RS} - 35$ |
| 75-154 | 80 | $I_{CSI-RS} - 75$ |

The terminal may verify the frequency and time positions, and the period and offset via Table 2. Qcl-CRS-info configures quasi co-location information for coordinated multipoint (CoMP). CSI-IM config is for configuring the frequency and time positions of CSI-IM for measuring interference. Because CSI-IM is always configured based on four ports, the number of antenna ports is not required to be configured, and resource config and subframe config are configured in the same manner as CSI-RS. CQI report config is for configuring how to report the channel state by using a corresponding CSI process. CQI report config include periodic channel state report configuration, aperiodic channel state report configuration, precoder matrix indicator (PMI)/rank indicator (RI) report configuration, RI reference CSI process configuration, and subframe pattern configuration.

A subframe pattern is for configuring a channel having a temporally different characteristic and a measurement subframe subset for supporting interference measurement, with respect to channel received by the terminal and interference measurement. The measurement subframe subset has been introduced in enhanced inter-cell interference coordination (eICIC) to reflect and estimate different interference characteristics of an almost blank subframe (ABS) and a general subframe other than ABS. Then, the measurement subframe subset has been developed in enhanced interference mitigation and traffic adaptation (eIMTA) to an improved form in which two IMRs are configured to measure different channel characteristics between a subframe always operating as DL and a subframe dynamically switching between DL and UL. Tables 3 and 4 indicate measurement subframe subset IMRs for supporting eICIC and eIMTA.

TABLE 3

```
CQI-ReportConfig-r10 ::=   SEQUENCE {
    cqi-ReportAperiodic-r10            CQI-ReportAperiodic-r10      OPTIONAL, -
    -Need ON
    nomPDSCH-RS-EPRE-Offset            INTEGER (-1..6),
    cqi-ReportPeriodic-r10             CQI-ReportPeriodic-r10       OPTIONAL, -
    -Need ON
    pmi-RI-Report-r9                   ENUMERATED (setup)           OPTIONAL, --
COND PMIRIPCELL
    csi-SubframePatternConfig-r10      CHOICE {
        release                            NULL,
        setup                              SEQUENCE {
            csi-MeasSubframeSet1-r10,          MeasSubframePattern-r10,
            csi-MeasSubframeSet2-r10,          MeasSubframePattern-r10
        }
    }
}
```

TABLE 4

```
CQI-ReportConfig-v1250 ::=     SEQUENCE {
    csi-SubframePatternConfig-r12          CHOICE {
        release                                NULL,
        setup                                  SEQUENCE {
            csi-MeasSubframeSets-r12                   BIT STRING (SIZE (10))
        }
    }
    OPTIONAL,     --NEED ON
    cqi-ReportBoth-v1250                       CQI-ReportBoth-v1250
    OPTIONAL,     --NEED ON
    cqi-ReportAperiodic-v1250                  CQI-ReportAperiodic-v1250
    OPTIONAL,     --NEED ON
    altCQI-Table-r12                       ENUMERATED {
                                               allSubframes, csi-SubframeSet1,
                                               csi-SubframeSet2, spare1}      OPTIONAL
                                           --NEED OP
}
``` eICIC measurement subframe subset supported in LTE is configured by using csi-MeasSubframeSet1-r10 and csi-MeasSubframeSet2-r10. MeasSubframePattern-r10 referred by the corresponding field is as in Table 5.

TABLE 5

```
-- ASN1START
MeasSubframePattern-r10 ::= CHOICE {
    subframePatternFDD-r10        BIT STRING (SIZE (40)),
    subframePatternTDD-r10        CHOICE {
        subframeConfig1-5-r10         BIT STRING (SIZE (20)),
        subframeConfig0-r10           BIT STRING (SIZE (70)),
        subframeConfig6-r10           BIT STRING (SIZE (60)),
    ...
    },
    ...
}
```

Referring to Table 5, a left most significant bit (MSB) denotes subframe #0 and when a value of a bit is 1, the bit indicates that the subframe corresponding to the bit is included in the measurement subframe subset. Unlike an eICIC measurement subframe subset in which each subframe set is configured via each field, an eIMTA measurement subframe subset indicates 0 as a first subframe set and 1 as a second subframe set by using one field. Accordingly, in eICIC, a corresponding subframe may not be included in two subframe sets, but in eIMTA, a subframe set should be included in one of two subframe sets.

In addition, there are $P_C$ indicating a power ratio between CSI-RS RE and PDSCH required for the terminal to generate a channel state report, and codebook subset restriction for configuring which codebook is to be used. $P_C$ and codebook subset restriction denote configuration for each subframe subset by p-C-AndCBSRList field including two p-C-AndCBSR fields of FIG. 7 in a list form.

TABLE 6

```
CSI-Process-r11 ::=      SEQUENCE {
    ...
    p-C-AndCBSRList-r11 SEQUENCE (SIZE (1...2)) OF P-C-AndCBSR-
    r11,
    ...
}
```

TABLE 7

```
P-C-AndCBSR-r11 ::= SEQUENCE {
    p-C-r11                       INTEGER (-8..15),
    codebookSubsetRestriction-r11 BIT STRING
}
```

$P_C$ may be represented by Equation 1 and a value between −8 to 15 dB may be assigned.

$$P_c = \frac{PDSCH\ EPRE}{CSI\text{-}RS\ EPRE} \qquad \text{[Equation 1]}$$

The base station may variably adjust CSI-RS transmit power for various purposes, such as channel estimation accuracy improvement, and the terminal may determine, via $P_C$, how much lower or higher transmit power to be used for data transmission is than transmit power used for channel estimation. Accordingly, even when the base station changes the CSI-RS transmit power, it is possible for the terminal to calculate accurate channel quality indicator (CQI) and transmit CQI to the base station.

In a cellular system, the base station may transmit a reference signal to the terminal to measure a DL channel state. In LTE-A system of 3GPP, the terminal measures a channel state between the base station and the terminal by using CRS or CSI-RS transmitted by the base station. Several factors are considered in channel state measurement and include an interference in DL. the interference in DL includes an interference signal and thermal noise generated by an antenna belonging to an adjacent base station and is important for the terminal to determine the channel state of DL. For example, when the base station having one transmission antenna transmits a signal to the terminal having one reception antenna, the terminal needs to determine energy per symbol receivable via DL and an interference to be simultaneously received in a period where the symbol is received, by using a received reference signal, and determine Es/Io. The determined Es/Io is converted into a data transmission speed or a value corresponding thereto and is notified to the base station in a form of CQI, and thus the base station may determine at which data transmission speed transmission to the terminal is to be performed in DL.

In the LTE-A system, the terminal may feed back information about the channel state of DL to the base station to be used for DL scheduling of the base station. In other words, the terminal measures a reference signal transmitted by the base station via DL and feeds back extracted information to the base station in a form defined by the LTE/LTE-A standard. The information fed back by the terminal in LTE/LTE-A largely includes following three types.

Rank indicator (RI): Number of spatial layers receivable by terminal in current channel state Precoder matrix indicator (PMI): Indicator for precoding matrix desired by terminal in current channel state Channel quality indicator (CQI): Maximum data rate receivable by terminal in current channel state CQI may be replaced by a signal-to-interference-and-noise-ratio (SINR) that may be used similarly as the maximum data rate, a maximum error correction code rate, a modulation scheme, and data efficiency per frequency.

RI, PMI, and CQI are associated with each other. For example, the precoding matrix supported in the LTE, LTE-A, and similar system is differently defined for each rank. Accordingly, a value of PMI when RI is 1 and a value of PMI when RI is 2 may be the same but may be interpreted differently. Also, even when the terminal determines CQI, the CQI is determined assuming that a value of rank and a value of PMI notified to the base station are applied to the base station. In other words, when the terminal notified RI_X, PMI_Y, CQI_Z to the base station, the data rate corresponding to CQI_Z may be received by the terminal when a rank is RI_X and precoding is PMI_Y. As such, when calculating CQ, the terminal assumes which transmission is to be performed on the base station to obtain optimized performance when transmission is performed in the transmission method.

Periodic feedback of the terminal in the LTE, LTE-A, and similar system may be configured to one of four reporting modes or feedback modes below, based on information included therein.

Reporting mode 1-0 (wideband CQ with no PMI): RI, wideband CQI(wCQI)

Reporting mode 1-1 (wideband CQI with single PMI): RI, wCQI, PMI

Reporting mode 2-0 (subband CQI with no PMI): RI, wCQI, subband CQI(sCQI)

Reporting mode 2-1 (subband CQI with single PMI): RI, wCQI, sCQI, PMI

Feedback timing of each information for the four reporting modes is determined according to values of $N_{pd}$, $N_{OFFSET,CQI}$, $M_{RI}$, and $N_{OFFSET,RI}$ transmitted via a higher layer signal. A transmission period of wCQI in the reporting mode 1-0 is $N_{pd}$, and the feedback timing is determined with a subframe offset value of $N_{OFFSET,CQI}$. Also, a transmission period of RI is $N_{pd}$, $M_{RI}$ and an offset is $N_{OFFSET,CQI}$+$N_{OFFSET,RI}$.

Figure 2:
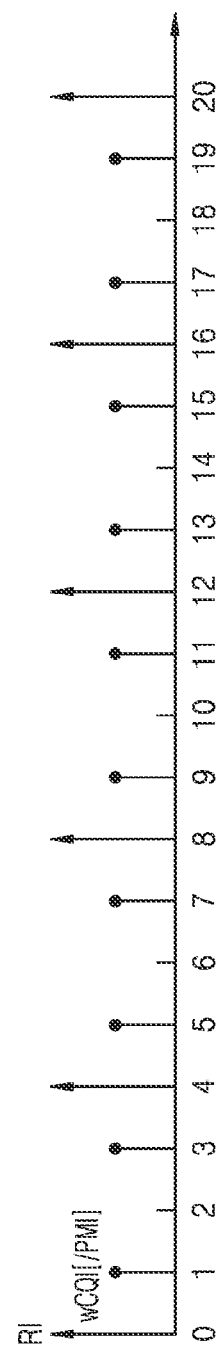
FIG. 2 is a diagram showing feedback timing of a rank indicator (RI) and a wideband channel quality indicator (wCQI) when $N_{pd}=2$, $M_{RI}=2$, $N_{OFFSET,CQI}=1$, $N_{OFFSET,RI}=-1$.

FIG. 2 is a diagram showing feedback timing of RI and wCQI when $N_{pd}$=2, $M_{RI}$=2, $N_{OFFSET,CQI}$=1, $N_{OFFSET,RI}$=−1.

Referring to FIG. 2, the reporting mode 1-1 has the same feedback timing as the reporting mode 1-0, but is different from the reporting mode 1-0 in that wCQI and PMI are transmitted together at wCQI transmission timing.

In the reporting mode 2-0, a feedback period of sCQI is $N_{pd}$ and an offset value is $N_{OFFSET,CQI}$. Also, a feedback period of wCQI is $H \cdot N_{pd}$ and an offset value is $N_{OFFSET,CQI}$ like the offset value of sCQI. Here, H=J·K+1 is defined wherein K is transmitted via a higher signal and J is a value determined according to a system bandwidth. For example, a value of J for a 10 MHz system may be defined as 3. As a result, wCQI is transmitted by replacing sCQI once per sCQI transmission of H times. Also, a period of RI is $M_{RI} \cdot H \cdot N_{pd}$ and an offset is $N_{OFFSET,CQI}$+$N_{OFFSET,RI}$.

Figure 3:
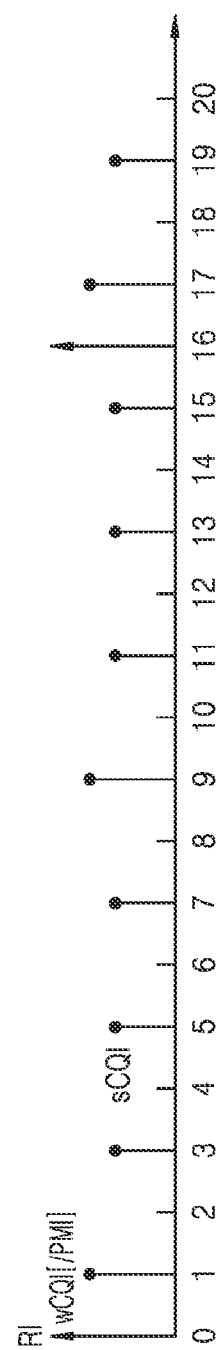
FIG. 3 is a diagram showing feedback timing of RI, subband CQI (sCQI), and wCQI when $N_{pd}=2$, $M_{RI}=2$, J=3 (10 MHz), K=1, $N_{OFFSET,CQI}=1$, $N_{OFFSET,RI}=-1$.

FIG. 3 is a diagram showing feedback timing of RI, sCQI, and wCQI when $N_{pd}$=2, $M_{RI}$=2, J=3(10 MHz), K=1, $N_{OFFSET,CQI}$=1, $N_{OFFSET,RI}$=−1.

The reporting mode 2-1 has the same feedback timing as the reporting mode 2-0, but is different from the reporting mode 2-0 in that PMI is transmitted together at wCQI transmission timing.

The feedback timing described above is feedback timing when the number of CSI-RS antenna ports is less than or equal to 4, and in the case of a terminal assigned with CSI-RS for 8 antenna ports, two pieces of PMI information need to be fed back unlike the feedback timing described above. In particular, for 8 CSI-RS antenna ports, the reporting mode 1-1 is divided again into two submodes, and RI is transmitted together with first PMI information in a first submode and second PMI information is transmitted together with wCQI. Here, a period and offset of feedback regarding wCQI and second PMI are defined as $N_{pd}$ and $N_{OFFSET,CQI}$, and a period and offset value of feedback regarding RI and first PMI information are respectively defined as $M_{RI} \cdot N_{pd}$ and $N_{OFFSET,CQI}$+$N_{OFFSET,RI}$. Also, when W1 denotes a precoding matrix corresponding to the first PMI and W2 denotes a precoding matrix corresponding to the second PMI, the terminal and the base station share information indicating that precoding matrixes desired by the terminal are determined as W1 and W2.

Figure 4:
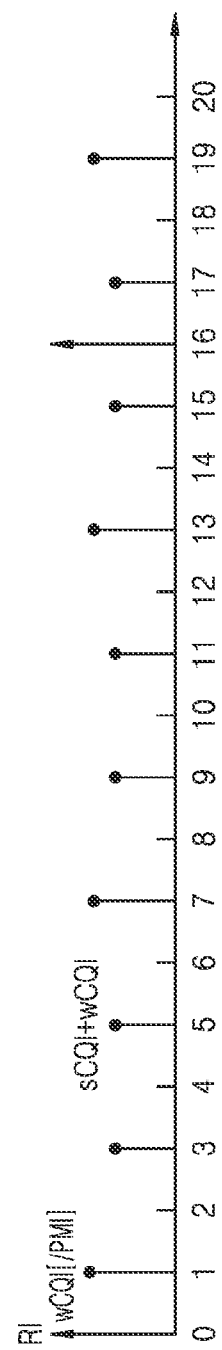
FIGS. 4 and 5 are diagrams respectively showing a case when a precoding type indicator (PTI) is 0 and feedback timing when PTI is 0, when $N_{pd}=2$, $M_{RI}=2$, J=3(10 MHz), K=1, H'=3, $N_{OFFSET,CQI}=1$, $N_{OFFSET,RI}=-1$.
Figure 5:
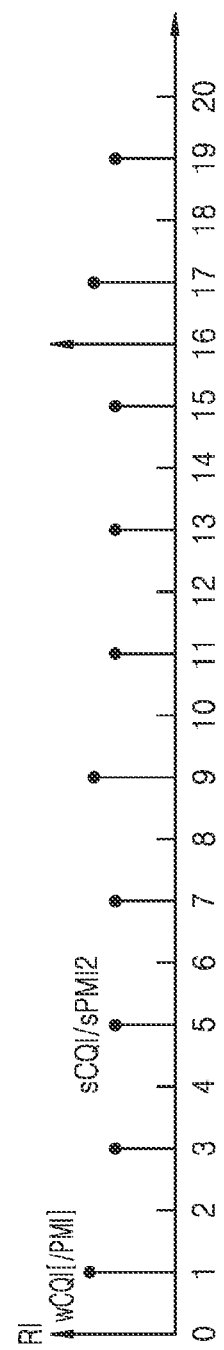

FIGS. 4 and 5 are diagrams respectively showing a case when precoding type indicator (PTI) is 0 and feedback timing when PTI is 0, when $N_{pd}$=2, $M_{RI}$=2, J=3(10 MHz), K=1, H'=3, $N_{OFFSET,CQI}$=1, $N_{OFFSET,RI}$=−1.

In the reporting mode 2-1 regarding 8 CSI-RS antenna ports, feedback of PTI information is added. PTI is fed back together with RI and a period thereof is $M_{RI} \cdot H \cdot N_{pd}$ and an offset is defined as $N_{OFFSET,CQI}$+$N_{OFFSET,RI}$. When PTI is 0, first PMI, second PMI, and wCQI are all fed back, wCQI and second PMI are transmitted together at the same timing, and a period thereof is $N_{pd}$ and an offset is $N_{OFFSET,CQI}$. Also, a period of first PMI is $H' \cdot N_{pd}$ and an offset is $N_{OFFSET,CQI}$. Here, H' is transmitted to a higher signal. When PTI is 1, PTI and RI are transmitted together, wCQI and second PMI are transmitted together, and sCQI is fed back at an additional separate timing. In this case, first PMI is not transmitted. A period and offset of PTI and RI are the same as those when PTI is 0 and sCQI has a period of $N_{pd}$ and an offset of $N_{OFFSET,CQI}$. Also, wCQI and second PMI are fed back with a period of $H \cdot N_{pd}$ and an offset of $N_{OFFSET,CQI}$, and H is defined as when the number of CSI-RS antenna ports is 4.

Figure 6:
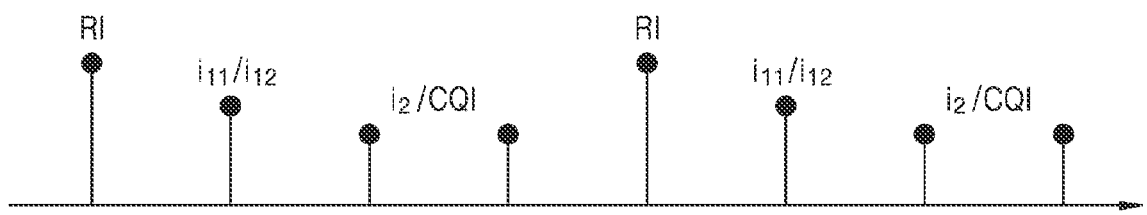
FIG. 6 is a diagram for describing a periodic channel state report supported by terminals where channel state information reference signals (CSI-RS) of at least 12 ports are configured in an LTE, LTE-A, or similar system.

FIG. 6 is a diagram for describing a periodic channel state report supported by terminals where CSI-RS of at least 12 ports are configured in an LTE, LTE-A, or similar system.

In the 3GPP LTE release 13 and release 14 standard, non-precoded (NP) CSI-RS is supported to support at least 12 CSI-RS ports for 2-D arrangement antenna. In NP CSI-RS, 8, 12, 16, or more CSI-RS ports are supported by using positions for existing CSI-RS in one subframe. A corresponding field is configured in CSI-RS-ConfigNZP-EMIMO. The terminal may determine and receive a position of an CSI-RS resource by using the field. Also, in beamformed (BF) CSI-RS, BF CSI-RS is used by gathering individual CSI-RS resources in which the number of CSI-RS ports, subframes, and codebook subset restrictions are all different, by using csi-RS-ConfigNZPIdListExt-r13 and csi-IM-ConfigIdListExt-r13. To support 2-D antenna in NP CSI-RS, a new 2-D codebook is required and the new 2-D codebook may vary depending on antenna for each dimension, an oversampling factor, and codebook configuration. When a PMI bit of the 2-D codebook is analyzed, all bits for an i2 (W2) report are less than or equal to 4 bits and an existing channel state report method may be used. However, in the case of i11/i12, the PMI bit is increased as below with respect to supported N1, N2, O1, O2, and codebookConfig as shown in Table 8A, 8B and 8C.

TABLE 8A

| (N1, N2) | (O1, O2) combinations |
|---|---|
| (8, 1) | (4, —) (8, —); |
| (2, 2) | (4, 4), (8, 8) |
| (2, 3) | (8, 4), (8, 8) |
| (8, 2) | {(8, 4), (4, 4)} |
| (2, 4) | {(8, 4), (8, 8)} |
| (4, 2) | {(8, 4), (4, 4)} |

TABLE 8B

| Config = 1 | | | | |
|---|---|---|---|---|
| (N1,N2) | (O1,O2) | W11/W12 bits | (O1,O2) | W11/W12 bits |
| (8,1) | (4,—) | 5 + 2 bits | (8,—) | 6 + 2 bits |
| (2,2) | (4,4) | 3 + 1 bits/3 bits | (8,8) | 4 + 1 bits/4 bits |
| (2,3) | (8,4) | 4 + 1 bits/4 bits | (8,8) | 4 + 1 bits/5 bits |
| (3,2) | (8,4) | 5 + 1 bits/3 bits | (4,4) | 4 + 1 bits/3 bits |
| (2,4) | (8,4) | 4 + 1 bits/4 bits | (8,8) | 4 + 1 bits/5 bits |
| (4,2) | (8,4) | 5 + 1 bits/3 bits | (4,4) | 4 + 1 bits/3 bits |

+k: additional bits for rank 3 and 4

TABLE 8C

| Config = 2, 3, 4 | | | | |
|---|---|---|---|---|
| (N1,N2) | (O1,O2) | W11/W12 bits | (O1,O2) | W11/W12 bits |
| (8,1) | (4,—) | 4 + 2 bits | (8,—) | 5 + 2 bits |
| (2,2) | (4,4) | 2 + 1 bits/2 bits | (8,8) | 3 + 1 bits/3 bits |
| (2,3) | (8,4) | 3 + 1 bits/3 bits | (8,8) | 3 + 1 bits/4 bits |
| (3,2) | (8,4) | 4 + 1 bits/4 bits | (4,4) | 3 + 1 bits/2 bits |

TABLE 8C-continued

Config = 2, 3, 4

| (N1,N2) | (O1,O2) | W11/W12 bits | (O1,O2) | W11/W12 bits |
|---------|---------|--------------|---------|--------------|
| (2,4)   | (8,4)   | 3 + 1 bits/3 bits | (8,8) | 3 + 1 bits/4 bits |
| (4,2)   | (8,4)   | 4 + 1 bits/2 bits | (4,4) | 3 + 1 bits/2 bits |

+k: additional bits for rank 3 and 4

Figure 8:
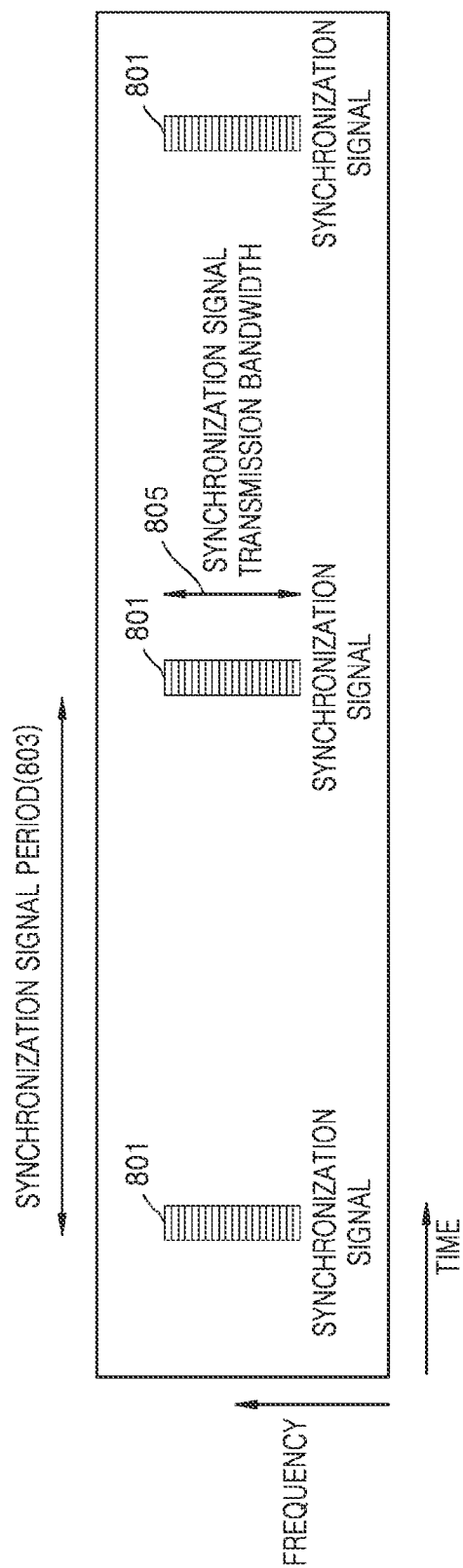
FIG. 8 is a diagram for describing a method of transmitting a synchronization signal considered in a 5G or NR system.

Referring to FIG. 8, i1 is the maximum when (N1, N2, O1, O2)=(2,4,8,8) and Config is 1, and thus 10 bits need to be transmitted. In the case of PUCCH format 2 used for existing periodic channel state report, a Reed-Muller code used for channel coding may be transmitted up to 13 bits, but in the case of extended CP, HARQ ACK/NACK of 2 bits needs to be supported, and thus the size of actually transmittable payload in a normal CP situation is 11 bits. To support such a size of the payload, three types of independent CSI feedback timing shown in FIG. 6 are used in both wCQI mode and sCQI mode.

The LTE, LTE-A, and similar system not only support periodic feedback of the terminal, but also aperiodic feedback. When the base station wants to obtain aperiodic feedback information of a specific terminal, the base station may perform UL data scheduling of the terminal by configuring an aperiodic feedback indicator included in DCI for UL data scheduling of the terminal to perform specific aperiodic feedback. Upon receiving the indicator configured to perform the aperiodic feedback in an $n^{th}$ subframe, the terminal performs UL transmission by adding aperiodic feedback information to data transmission in n+$k^{th}$ subframe. Here, k is a parameter defined in the 3GPP LTE release 11 standard, and is 4 in FDD and is defined as Table 9 in TDD.

TABLE 9

| TDD UL/DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | 7 | 4 | — | — | 6 | 7 | 4 |
| 1 | — | — | 6 | 4 | — | — | — | 6 | 4 | — |
| 2 | — | — | 4 | — | — | — | — | 4 | — | — |
| 3 | — | — | 4 | 4 | 4 | — | — | — | — | — |
| 4 | — | — | 4 | 4 | — | — | — | — | — | — |
| 5 | — | — | 4 | — | — | — | — | — | — | — |
| 6 | — | — | 7 | 7 | 5 | — | — | 7 | 7 | — |

When the aperiodic feedback is configured, the feedback information includes RI, PMI, and CQI as in the periodic feedback and RI and PMI may not be fed back based on feedback configuration. Also, CQI may include both wCQI and sCQI or may include only wCQI.

Figure 12:
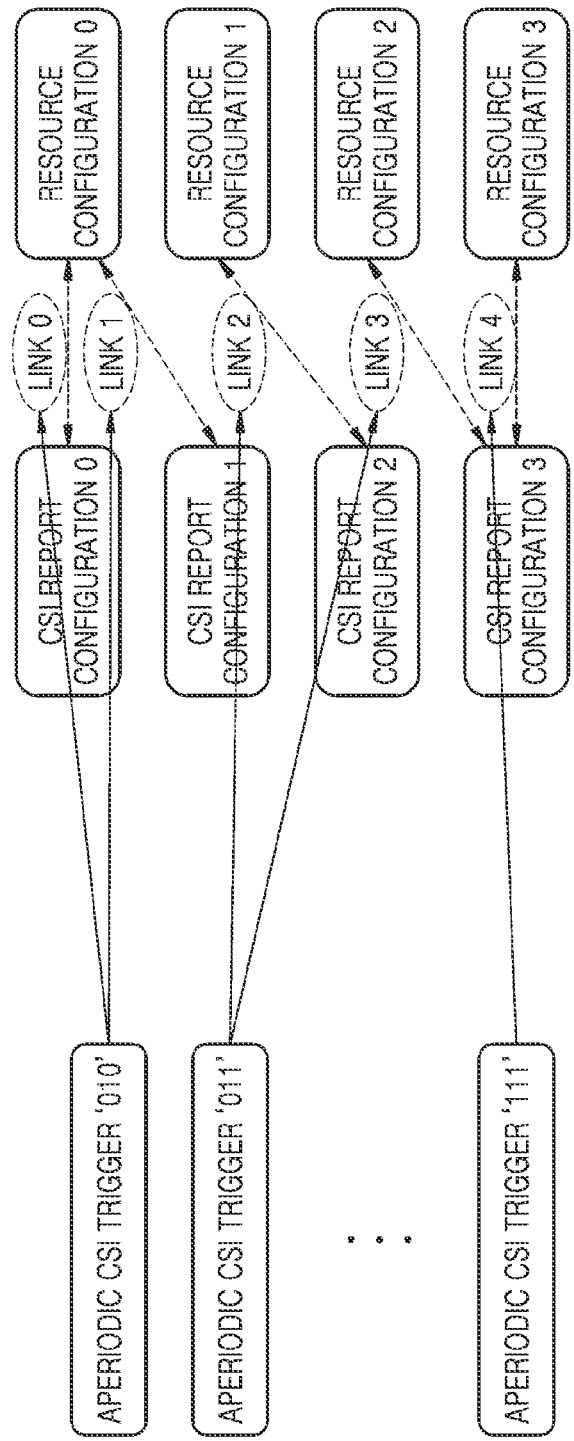
FIG. 12 is a diagram for describing a method of triggering a link in a trigger measurement configuration according to a first aperiodic channel state report trigger method in a 5G or NR system.

The LTE, LTE-A, or similar system provide a codebook subsampling function for periodic channel state report. The periodic feedback of the terminal in the LTE, LTE-A, or similar system is transmitted to the base station via PUCCH. Because an amount of information transmittable at once via PUCCH is limited, various feedback objects such as RI, wCQI, sCQI, PMI1, wPMI2, and sPMI2 may be transmitted via PUCCH through subsampling or two or more pieces of feedback information may be transmitted via PUCCH after joint encoding. For example, when the number of CSI-RS ports configured by the base station is 8, RI and PMI1 reported in submode 1 of PUCCH mode 1-1 may be encoded together as in Table 11. Based on Table 10, RI configured of 3 bits and PMI1 configured of 4 bits may be joint-encoded into total 5 bits. In submode 2 of PUCCH mode 1-1, PMI1 configured of 4 bits and PMI2 configured of another 4 bits may be joint-encoded into total 4 bits as shown in Table 11. In submode 2, because a subsampling level is higher than submode 1 (4->3 in submode 1 and 8->4 in submode 2), more precoding indexes are unable to be reported. As another example, when the number of CSI-RS ports configured by the base station is 8, PMI2 reported in PUCCH mode 2-1 may be subsampled as shown in Table 12. Referring to FIG. 12, PMI2 is reported in 4 bits when associated RI is 1. However, when the associated RI is at least 2, differential CQI for second codeword needs to be additionally reported together, and thus PMI2 is reported after being subsampled in 2 bits.

TABLE 10

| Value of joint encoding of RI and the first PMI $I_{RI/PMI1}$ | RI | Codebook index $i_1$ |
|---|---|---|
| 0-7 | 1 | $2I_{RI/PMI1}$ |
| 8-15 | 2 | $2(I_{RI/PMI1} - 8)$ |
| 16-17 | 3 | $2(I_{RI/PMI1} - 16)$ |
| 18-19 | 4 | $2(I_{RI/PMI1} - 18)$ |
| 20-21 | 5 | $2(I_{RI/PMI1} - 20)$ |
| 22-23 | 6 | $2(I_{RI/PMI1} - 22)$ |
| 24-25 | 7 | $2(I_{RI/PMI1} - 24)$ |
| 26 | 8 | 0 |
| 27-31 | reserved | NA |

TABLE 11

| | Relationship between the first PMI value and codebook index $i_1$ | | Relationship between the second PMI value and codebook index $i_2$ | | |
|---|---|---|---|---|---|
| RI | Value of the first PMI $I_{PMI1}$ | codebook index $i_1$ | Value of the second PMI $I_{PMI2}$ | Codebook index $i_2$ | total #bits |
| 1 | 0-7 | $2I_{PMI1}$ | 0-1 | $2I_{PMI2}$ | 4 |
| 2 | 0-7 | $2I_{PMI1}$ | 0-1 | $I_{PMI2}$ | 4 |
| 3 | 0-1 | $2I_{PMI1}$ | 0-7 | $4[I_{PMI2}/4] + I_{PMI2}$ | 4 |
| 4 | 0-1 | $2I_{PMI1}$ | 0-7 | $I_{PMI2}$ | 4 |
| 5 | 0-3 | $I_{PMI1}$ | 0 | 0 | 2 |
| 6 | 0-3 | $I_{PMI1}$ | 0 | 0 | 2 |
| 7 | 0-3 | $I_{PMI1}$ | 0 | 0 | 2 |
| 8 | 0 | 0 | 0 | 0 | 0 |

TABLE 12

Relationship between the second RAI value and codebook index $i_2$

| RI | Value of the second PMI $I_{PMI2}$ | Codebook index $i_2$ |
|---|---|---|
| 1 | 0-15 | $I_{PMI2}$ |
| 2 | 0-3 | $2I_{PMI2}$ |
| 3 | 0-3 | $8 * [I_{PMI2}/2] + (I_{PMI2} \bmod 2) + 2$ |
| 4 | 0-3 | $2I_{PMI2}$ |
| 5 | 0 | 0 |
| 6 | 0 | 0 |
| 7 | 0 | 0 |
| 8 | 0 | 0 |

Figure 7:
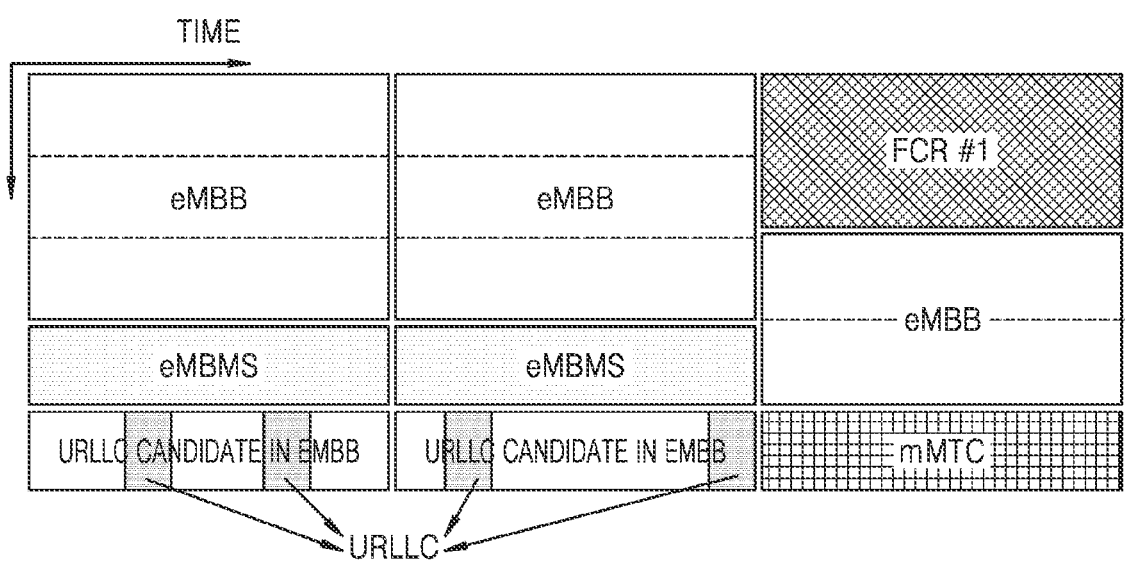
FIG. 7 is a diagram for describing a method of assigning, in radio resources, pieces of data of enhanced mobile broadband (eMBB), ultra-reliable and low latency communication (URLLC), and massive machine type communication (mMTC), which are services considered in a $5^{th}$ generation (5G) or new radio (NR) system.

FIG. 7 is a diagram for describing a method of assigning, in radio resources, pieces of data of enhanced mobile broadband (eMBB), ultra-reliable and low latency communication (URLLC), and massive machine type communication (mMTC), which are services considered in a $5^{th}$ generation (5G) or new radio (NR) system.

Referring to FIG. 7, when URLLC data is generated and needs to be transmitted while eMBB data and mMTC data are assigned and transmitted in a specific frequency band, the URLLC data may be transmitted after emptying a portion where the eMBB data and the mMTC data are previously assigned. Because it is important for a URLLC service to have particularly short latency, the URLLC data may be transmitted by being assigned to a part of a resource to which the eMBB data is assigned, and the resource to which the eMBB data is assigned may be pre-notified to the terminal. In this regard, the eMBB data may not be transmitted in a frequency-time resource where the eMBB data and the URLLC data overlap each other, and thus transmission performance of the eMBB data may be decreased. In other words, transmission failure of the eMBB data may occur due to assignment of the URLLC data. Here, the length of transmission time interval (TTI) used to transmit the URLLC data may be shorter than the length of TTI used to transmit the eMBB data or mMTC data.

Also, a resource FCR #1 among radio resources may be prepared for a technology to be applied in the future.

FIG. 8 is a diagram for describing a method of transmitting a synchronization signal considered in a 5G or NR system.

A synchronization signal is used to obtain synchronization with a cell in a network while a terminal accesses a wireless communication network. In particular, the synchronization signal denotes a reference signal transmitted by a base station for time and frequency synchronization and cell search during an initial access of the terminal, and in an LTE, LTE-A, or similar system, a signal such as a primary synchronization signal (PSS), a secondary synchronization signal (SSS), or the like may be transmitted for synchronization.

Referring to FIG. 8, in the 5G or NR system, a synchronization signal 801 may be transmitted at a uniform synchronization signal period 803 in terms of a time axis. Also, the synchronization signal 801 may be transmitted via a uniform synchronization signal transmission bandwidth 805 in terms of a frequency axis. The synchronization signal 801 may map a specific sequence to a subcarrier in the synchronization signal transmission bandwidth 805 to indicate a cell identification (ID). In this case, the cell ID may be mapped in one sequence or a combination of a plurality of sequences, and the terminal may detect the cell ID to be accessed by the terminal by detecting a sequence used for a synchronization signal.

The sequence used for the synchronization signal may include a sequence having a constant amplitude zero auto correlation (CAZAC) characteristic, such as a Zadoff-Chu sequence or a Golay sequence, or a pseudo random noise sequence, such as an M-sequence or a Gold sequence. Hereinafter, it is assumed that the above-described synchronization signal is used. However, such a synchronization signal is only an embodiment and is not limited thereto, and a synchronization signal having various sequences may be used.

The synchronization signal 801 may be configured by using one OFDM symbol or by using a plurality of OFDM symbols. When the synchronization signal 801 is configured by using the plurality of OFDM symbols, a sequence for a plurality of other synchronization signals may be mapped to each OFDM symbol. For example, like in LTE, a PSS may be generated by using 3 Zadoff-Chu sequences and an SSS may be generated by using a Gold sequence. The PSS in one cell may have 3 different values according to a physical layer cell ID, and 3 cell IDs in one cell ID group correspond to different PSSs. Accordingly, the terminal may verify one cell group among 3 cell ID groups supported by the LTE system by detecting the PSS. The terminal may finally obtain a cell ID of a corresponding cell by additionally detecting an SSS among 168 cell IDs reduced from 504 cell IDs via the cell ID group verified via the PSS.

Figure 9:
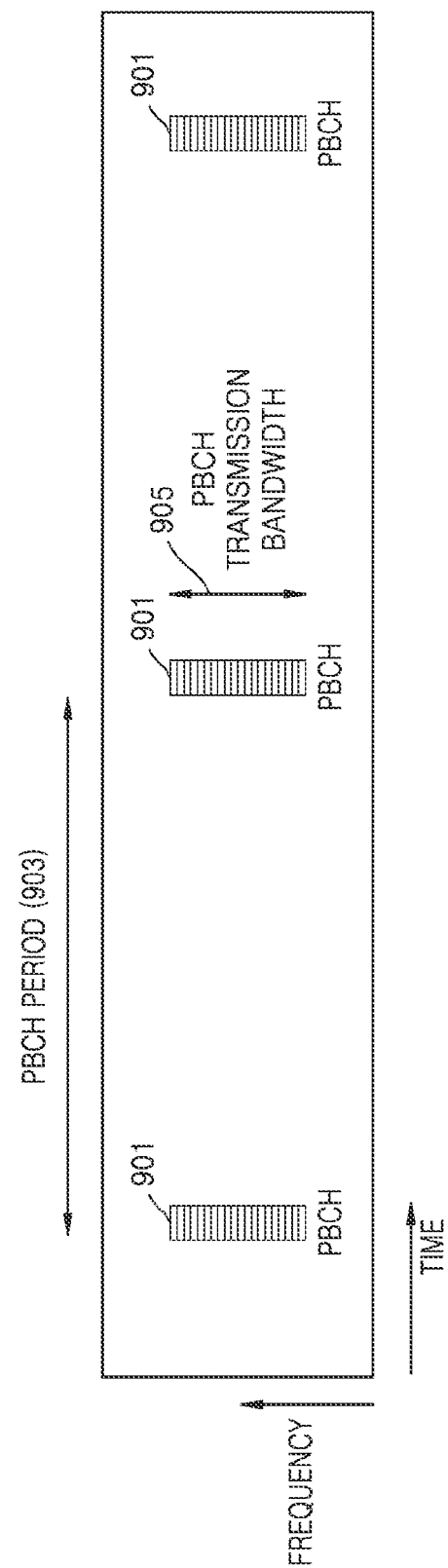
FIG. 9 is a diagram for describing a method of transmitting a physical broadcast channel (PBCH) considered in a 5G or NR system.

FIG. 9 is a diagram for describing a method of transmitting a physical broadcast channel (PBCH) considered in a 5G or NR system.

As described above, a terminal may perform synchronization with a cell in a network and obtain cell frame timing by obtaining a cell ID. Then, the terminal needs to receive system information of the cell. The system information is information repeatedly broadcasted by the network and is information that the terminal needs to know to access the cell and to suitably operate in the cell. In an LTE system, the system information is transmitted via two different transmission channels, wherein a master information block (MIB) is transmitted by using PBCH and a system information block (SIB) is transmitted by using PDSCH. The system information included in MIB includes DL transmission bandwidth, PHICH configuration information, and system frame number (SFN).

Referring to FIG. 9, in the 5G or NR system, a PBCH 901 may be transmitted at a uniform PBCH period 903 in terms of a time axis. Also, the PBCH 901 may be transmitted via a uniform PBCH transmission bandwidth 905 in terms of a frequency axis. For coverage improvement of a base station, the PBCHs 901 may be transmitted in same signals at the PBCH period 903 and a terminal may receive and combine the same signals. Also, during transmission of PBCH 901, the base station may obtain a diversity gain without additional information about a transmission technique used by a receiving end by applying a transmission technique such as transmit diversity (TxD) or one DMRS port-based precoder cycling, by using a plurality of antenna ports. Hereinafter, it is assumed that the above-described PBCH is used. However, the above PBCH is only an embodiment and is not limited thereto, and a PBCH having various structures may be used.

In the 5G or NR system, like the LTE system, the PBCH 901 may be configured by using a plurality of OFDM symbols in a radio resource of a time-frequency domain or may be configured by being distributed in radio resources of the time-frequency domain. The terminal needs to receive and decode PBCH to receive the system information. In the LTE system, channel estimation on the PBCH may be performed by using CRS.

Figure 10:
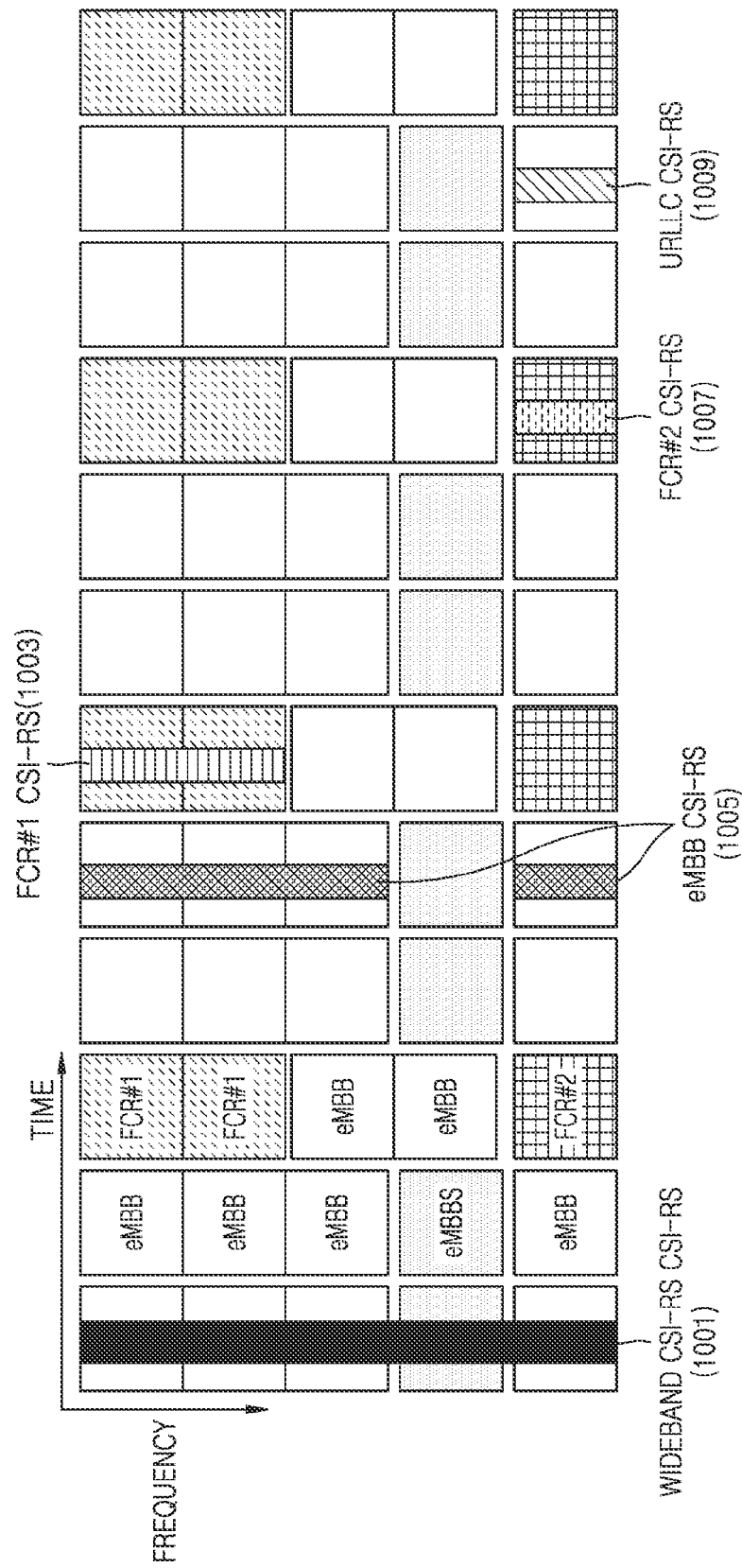
FIG. 10 is a diagram for describing a method of multiplexing each service in a 5G or NR system.

FIG. 10 is a diagram for describing an example of a method of multiplexing each service in a 5G or NR system.

Referring to FIG. 10, a base station may assign, to a terminal, CSI-RS of an entire band 1001 or a plurality of bands 1003, 1005, 1007, and 1009 to obtain initial channel state information. Because the CSI-RS of the entire band 1001 or the plurality of bands 1003, 1005, 1007, and 1009 requires a large amount of reference signal overhead, the CSI-RS may be disadvantageous in optimizing system performance, but the CSI-RS of the entire band 1001 or the plurality of bands 1003, 1005, 1007, and 1009 is essential when there is no previously obtained information. Each service after transmission of the CSI-RS of the entire band 1001 or the plurality of bands 1003, 1005, 1007, and 1009 may be provided with different requirements for each service, and accordingly, the accuracy and update necessity of required channel state information may also be different. Accordingly, after obtaining the initial channel state information, the base station may trigger subband CSI-RS for each service in a corresponding band as occasion demands for each service.

In FIG. 10, CSI-RS is transmitted for each service at one time point, but CSI-RS for a plurality of services may be transmitted as occasion demands.

Figure 11A:
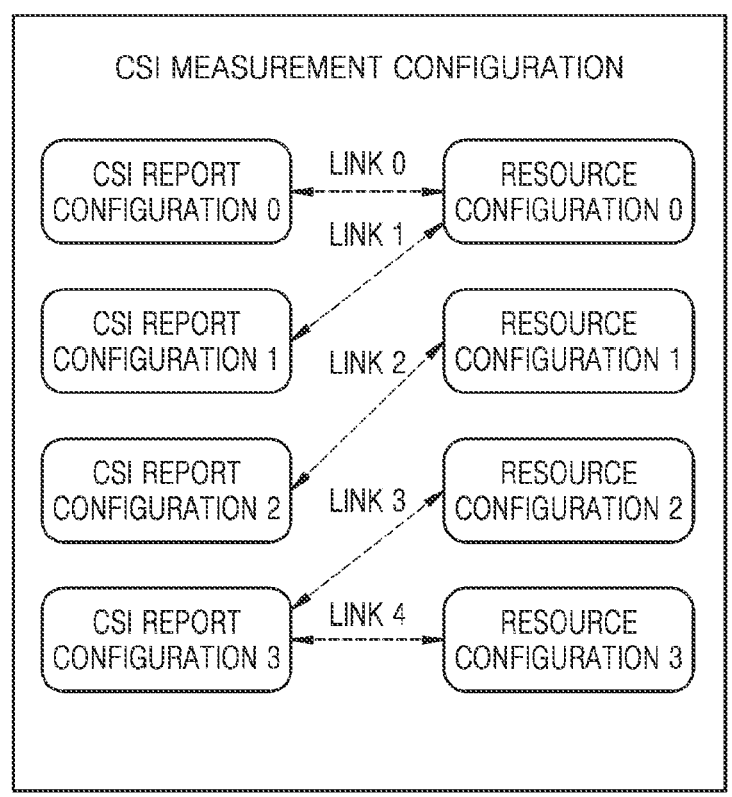
FIG. 11A is a diagram for describing a resource configuration, a channel measurement configuration, and a channel state report configuration required to support a channel state report in a 5G or NR system.

FIG. 11A is a diagram for describing resource configuration, channel measurement configuration, and channel state report configuration required to support a channel state report in a 5G or NR system.

CSI-RS transmission and CSI report configuration in an LTE system and CSI-RS transmission and CSI report configuration supported by the 5G or NR system may be different from each other. Unlike the LTE system, the 5G or NR system may support more flexible channel statue report configuration than the LTE system via resource configuration required to support a channel state report, channel measurement configuration, and channel state report configuration.

Referring to FIG. 11A, the resource configuration, the channel measurement configuration, and the channel state report configuration required to support the channel state report in the 5G or NR system are shown. The resource configuration, the channel measurement configuration, and the channel statue report configuration may include following configuration information.

Channel state report configuration (CSI reporting setting): Reporting parameters (for example, RI, PMI, CQI, and the like) required for a channel state report may be turned on or turned off. Also, a type (for example, Type I: a channel state report having low resolution, an implicit report type or Type II: a channel state report having high resolution, an eigen vector, a covariance matrix, and the like are reported explicitly by using a channel state report of a linear combination form) of the channel state report may be configured. In particular, channel state report configuration: whether to report RI, PMI, CQI, beam indicator (BI), or CSI-RS resource indicator (CRI) (individual configuration or combination configuration), a reporting method (periodic, aperiodic, or semi-persistent. Here, aperiodic and semi-persistent may be configured as one parameter), codebook configuration information, a PMI type (wideband/partial band), a channel state report type (implicit/explicit or Type I/Type II), a channel quality report type (CQI/reference signal received power (RSRP)), or resource configuration for a channel state report may be supported.

Resource configuration (resource setting): Configuration including configuration information regarding a reference signal required for channel state measurement. A CSI-RS resource for channel measurement and CSI-IM resource (IMR) for interference measurement may be configured, and in this regard, a plurality of resource configurations may be present. Also, a transmission type (periodic, aperiodic, or semi-persistent) of the reference signal, and a transmission period and offset of the reference signal may also be configured.

Channel measurement configuration: Mapping or connection between channel state report configuration and resource configuration is configured. For example, when there are N channel state report configurations and M resource configurations, L links configuring mapping between such pluralities of channel state report configurations and resource configurations may be included in the channel measurement configuration. Also, a correlation configuration between a reference signal configuration and a reporting time point (for example, when a reference signal is transmitted via n subframes or slots, a reporting time point may be configured by using parameters such as D0-0, D1-0, D2-1, D3-2, and D3-3, and the reporting time point may be defined as n+D0-0 accordingly) may also be configured.

In the 5G or NR system, semi-persistent reference signal transmission and channel state information transmission are supported in addition to periodic and aperiodic channel state report supported in LTE. Here, a subband report among the reporting mode described above may not be supported in the periodic and semi-persistent channel state information transmission of the 5G or NR system. PUCCH used in the periodic and semi-persistent channel state report has a limited amount of transmittable reports. Accordingly, in the LTE system, the terminal performs transmission by selecting subbands among a bandwidth part. However, because a report regarding such selective subband contains extremely limited information, usefulness of the information is not great. Accordingly, such an inefficient report may not be supported to reduce complexity of the terminal and increase efficiency of the report. Also, when the 5G or NR system does not support a subband report, PMI may not be reported during a periodic channel state information report or only one PMI corresponding to a wideband or partial band may be transmitted.

In an aperiodic channel state information report of the 5G or NR system, following reporting modes may be supported.

Reporting mode 1-0 (wideband CQI with no PMI): RI, wideband CQI(wCQI)

Reporting mode 1-1 (wideband CQI with single PMI): RI, wCQI, PMI

Reporting mode 1-2 (wideband CQI with multiple PMI): RI, wideband CQI(wCQI), plurality of wideband and subband PMIs Reporting mode 2-0 (subband CQI with no PMI): RI, wCQI, subband CQI (sCQI)

Reporting mode 2-1 (subband CQI with single PMI): RI, wCQI, sCQI, PMI

Reporting mode 2-2 (subband CQI with multiple PMIs): RI, wCQI, sCQI of band selected by terminal, plurality of wideband and subband PMIs Reporting mode 2-0 (subband CQI with no PMI): RI, wCQI, subband CQI(sCQI)

Reporting mode 2-0 (subband CQI with no PMI): RI, wCQI, subband CQI(sCQI)

Reporting mode 3-2 (subband CQI with multiple PMIs): RI, wCQI, subband CQI (sCQ) of entire band, plurality of wideband and subband PMIs Like a periodic channel state report, reporting modes 2-0 and 2-2 in an aperiodic channel state information report performs reporting by selecting one of subbands of a bandwidth part of the terminal, and may not be supported in the 5G or NR system due to low usefulness of the report. Also, in the case of a periodic channel state report in the LTE system, a channel state reporting mode may be configured by using PMI/RI report configuration and CQI configuration, and in the case of an aperiodic channel state report, the channel state reporting mode may be directly configured. In the 5G or NR system, PMI/RI report configuration and CQI report configuration required for the above-described channel state report configuration may be provided.

Also, in the 5G or NR system, two types of channel state reports having low space resolution and high space resolution as below are supported. Tables 13A, 13B, and 14 show the two types of channel state reports and Tables 15 and 16 show report overheads required for each report type.

TABLE 13A

Type I SP: Overview

For 2 ports, NR supports the following Type 1 codebook $$W \in \left\{ \frac{1}{\sqrt{2}} \begin{bmatrix} 1 \\ e^{j\frac{\pi n}{2}} \end{bmatrix}, n = 0, 1, 2, 3 \right\} \text{ for rank-1 and } \left\{ \frac{1}{2} \begin{bmatrix} 1 & 1 \\ j^n & -j^n \end{bmatrix}, n = 0, 1 \right\}$$

for rank-2

For ≥ 4 ports, NR supports the following Type I CSI for rank 1 to 8
 The PMI codebook assumes $W = W_1 W_2$ precoder structure, where $$W_1 = \begin{bmatrix} B & 0 \\ 0 & B \end{bmatrix}, B \text{ is composed to L overs mapled 2D DFT beams}$$

Figure 11B:
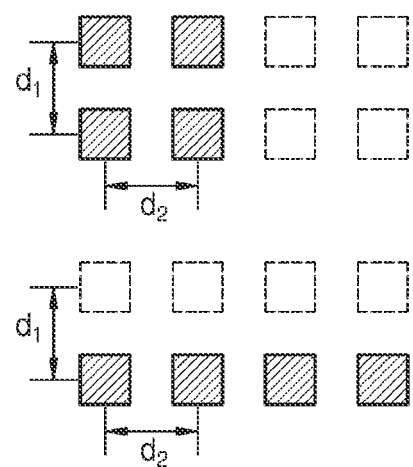
FIG. 11B is a diagram for describing a beam group pattern.

For rank 1 and 2, the value of L is configurable: L ∈ {1,4}
 $W_2$ performs beam selection (only for L = 4) and QPSK co-phasing between two polarizations
 The following 1D/2D antenna port layouts $(N_1, N_2)$ and oversampling factors $(O_1, O_2)$ (cf. Rel. 13/14 LTE Class A codebooks) are supported as Table 13B.
 For L = 4, the following beam group (B) pattern is supported as FIG. 11B

TABLE 14

Type II SP: Overview

NR supports Type II Cat 1 CSI for rank 1 and 2
PMI is used for Spatial Channel Information feedback
The PMI codebook assumes the following precoder structure:

For rank 1: $W = \begin{bmatrix} \tilde{W}_{0,0} \\ \tilde{W}_{1,0} \end{bmatrix} = W_1 W_2$, W is normalized to 1

For rank 2: $W = \begin{bmatrix} \tilde{W}_{0,0} & \tilde{W}_{0,1} \\ \tilde{W}_{1,0} & \tilde{W}_{1,1} \end{bmatrix} = W_1 W_2$, columns of W are normalized to $\frac{1}{\sqrt{2}}$ $$\tilde{W}_{0,0} = \sum_{i=0}^{L-1} b_{k_1^{(i)} k_2^{(i)}} \cdot p_{r,l,i}^{(WB)} \cdot p_{r,l,i}^{(SB)} \cdot c_{r,l,i} \text{ (weighted combination of } L \text{ beams)}$$

The value of L is configurable: L ∈ {2,3,4}
$b_{k_1,k_2}$ is an oversampled 2D DFT beam
r = 0,1 (polarization), l = 0,1 (layer)
$p_{r,l,i}^{(WB)}$ wideband (WB) beam amplitude scaling factor for beam I and on polarization r and layer l
$p_{r,l,i}^{(SB)}$ subband (SB) beam amplitude scaling factor for beam I and on polarization r and layer l
$c_{r,l,i}$ beam combining coefficient (phase) for beam I and on polarization r and layer l
 Configurable between QPSK (2 bits) and 8PSK (3 bits)
 Configurable amplitude scaling mode: between WB + SB (with unequal bit allocation) and WB-only

TABLE 13B

| Number of CSI-RS ports | $(N_1, N_2)$ | $(O_1, O_2)$ |
|---|---|---|
| 4 | (2, 1) | (4, —) |
| 8 | (2, 2) | (2, 1) |
|  | (4, 1) | (4, —) |
| 12 | (3, 2) | (2, 1) |
|  | (6, 1) | (4, —) |
| 16 | (4, 2) | (2, 1) |
|  | (8, 1) | (4, —) |
| 24 | (6, 2), (4, 3) | (2, 1) |
|  | (12, 1) | (4, —) |
| 32 | (8, 2), (4, 4) | (2, 1) |
|  | (16, 1) | (4, —) |

TABLE 15

| Number of CSI-RS reports | $(N_1, N_2)$ | $(O_1, O_2)$ | i1 Payload (L = 1) | i1 Payload (L = 4) | i2 payload |
|---|---|---|---|---|---|
| 4 | (2, 1) | (4, —) | 3 bits | 2 bits | For rank1 |
| 8 | (2, 2) | (2, 1) | 6 bits | 4 bits | 2 bits for L = 1 |
|  | (4, 1) | (4, —) | 4 bits | 3 bits | 4 bits for L = 4 |
| 12 | (3, 2) | (2, 1) | 7 bits | 5 bits | For rank 2, |
|  | (6, 1) | (4, —) | 4 bits | 3 bits | Additional |
| 16 | (4, 2) | (2, 1) | 7 bits | 5 bits | 2 bits for i1, |
|  | (8, 1) | (4, —) | 5 bits | 4 bits | 1 bits for L = 1, |
| 24 | (6, 2), (4, 3) | (2, 1) | 8 bits | 6 bits | 3 bits for L = 4 |
|  | (12, 1) | (4, —) | 6 bits | 5 bits |  |
| 32 | (8,2), (4, 4) | (2, 1) | 8 bits | 6 bits |  |
|  | (16, 1) | (4, —) | 6 bits | 5 bits |  |

TABLE 16

Type II SP: Example payload calculation for WB + SB amplitude
$(N_1, N_2) = (4, 4)$, Z = 3 (8-PSK phase), for K leading coefficients

| L(*) | Rotation $[\log_2(O_1 O_2)]$ | L-beam selection(**) | Strongest coefficient (1 out of 2 L): $[\log_2 2L]$ per layer | WB amp: 3 * (2 L − 1) per layer | Total WB payload | SB amp (1 B): 1 * (K − 1) per layer | SB phase (1 SB): Z * (K − 1) + 2 * (2 L − K) per layer | Total payload (WB + 10 SBs) |
|---|---|---|---|---|---|---|---|---|
| | | | | Rank 1 payload (bits) | | | | |
| 2 | 4 | [7 or 8] | 2 | 9 | 22 | 3 | 9 | 142 |
| 3 | 4 | [10 or 12] | 3 | 15 | 32 | 3 | 13 | 192 |
| 4 | 4 | [11 or 16] | 3 | 21 | 39 | 5 | 19 | 279 |

TABLE 16-continued

Type II SP: Example payload calculation for WB + SB amplitude
($N_1$, $N_2$) = (4, 4), Z = 3 (8-PSK phase), for K leading coefficients

| L(*) | Rotation [$\log_2(O_1O_2)$] | L-beam selection(**) | Strongest coefficient (1 out of 2 L): [$\log_2 2L$] per layer | WB amp: 3 * (2 L − 1) per layer | Total WB payload | SB amp (1 B): 1 * (K − 1) per layer | SB phase (1 SB): Z * (K − 1) + 2 * (2 L − K) per layer | Total payload (WB + 10 SBs) |
|---|---|---|---|---|---|---|---|---|
| | | | Rank 2 payload (bits) | | | | | |
| 2 | 4 | [7 or 8] | 4 | 18 | 33 | 6 | 18 | 273 |
| 3 | 4 | [10 or 12] | 6 | 30 | 50 | 6 | 26 | 370 |
| 4 | 4 | [11 or 16] | 6 | 42 | 63 | 10 | 38 | 543 |

(*)Note:
K = 4, 4 and 6 for L = 2, 3, and 4, respectively
In this example (for illustrative purposes), it is assumed that all $p_{r,l,i}^{(WB)} > 0$. The PMI payload is reduced when $p_{r,l,i}^{(WB)} = 0$. Details FFS.
(**)Note:
It is FFS if beam selection is signaled jointly using [$\log_2(_L{}^{N_1,N_2})$] bits vs. independently using [$\log_2(N_1N_2)$] bits per beam; only one approach will be specified. This example uses [$\log_2(_L{}^{N_1N_2})$] bits to calculate total WB payload and total payload.

In the type I channel state report, a channel state may be reported to the base station via RI, PMI, CQI, or CSI-RS resource indicator (CRI), based on a codebook as in existing LTE. In comparison, a Type II report is an implicit CSI type similar to the Type I report and may provide higher resolution via more PMI report overheads, and such a PMI report may be provided via linear combination of a precoder, beam, and co-phase used in the Type I report. Also, to report a direct channel state, the channel state may be reported in an explicit CSI form different from an existing CSI form, and a representative example includes a method of reporting a covariance matrix of a channel. Also, the channel state may be reported in a form in which an implicit CSI form and an explicit CSI form are combined. For example, a covariance matrix of a channel is reported as PMI, but in addition, CQI or RI may also be reported.

As such, the Type II report requires a high report overhead. Accordingly, the Type II report may not be suitable for a periodic channel state report where the number of reportable bits is not large. On the other hand, in the case of an aperiodic channel state report, because the Type II report is supported via PUSCH capable of supporting large overhead, the Type II report that requires the high report overhead may be suitable for an aperiodic channel state report.

Moreover, the Type II report may be supported in a semi-persistent channel state report. The semi-persistent channel state report in the 5G or NR system requires relatively high terminal complexity compared to the periodic channel state report because the semi-persistent channel state report supports dynamic activation/inaction.

In the channel state report of the LTE, LTE-A, and similar system, the base station transmits, to the terminal, a reference signal and report-related configuration based on a CSI process via a higher layer signal, as shown in Table 1. In the case of the periodic channel state report, the terminal performs a report via a reporting time point and resource previously configured, and in the case of the aperiodic channel state report, the base station reports configuration information that is previously configured via a trigger included in CDI transmitted via a DL control signal.

Referring to FIG. 11A, in the 5G or NR system, the channel state report configuration, the resource configuration, and information about the link connecting them may be included in the channel measurement configuration. A method, performed by the base station, of triggering the aperiodic channel state report to the terminal based on such configuration is as follows.

First aperiodic channel state report trigger method: Trigger based on link in measurement configuration Second aperiodic channel state report trigger method: Trigger based on channel state report configuration in measurement configuration The first aperiodic channel state report trigger method is a trigger method based on the link in the measurement configuration and the second aperiodic channel state report trigger method is a trigger method based on the channel state report configuration in the measurement configuration. This will be described with reference to FIGS. 12 through 15.

FIG. 12 is a diagram for describing a method of triggering a link in trigger measurement configuration according to the first aperiodic channel state report trigger method in a 5G or NR system.

Referring to FIG. 12, a base station may previously configure a link triggered for each trigger field to RRC for an aperiodic channel state report. Here, the base station may directly configure a link ID to trigger configuration to configure the link to be triggered.

Figure 13:
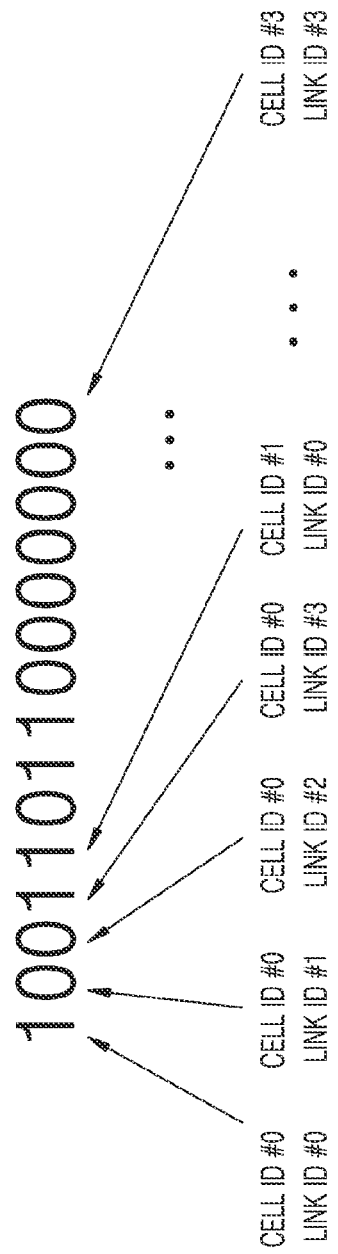
FIG. 13 is a diagram for describing an indication order of a bitmap for a first aperiodic channel state report trigger method in a 5G or NR system.

FIG. 13 is a diagram for describing an indication order of a bitmap for the first aperiodic channel state report trigger method in a 5G or NR system.

Referring to FIG. 13, a base station may configure aperiodic channel state report triggering by using a bitmap of links of all cells configured in a terminal. Here, an indication order of the bitmap may be aligned in an ascending order or a descending order based on cell IDs and link IDs. For example, the cell IDs may be aligned first, and then MSB to least significant bit (LSB) may be arranged in an ascending order based on the link IDs in the same cell ID. In FIG. 13, the cell IDs are first aligned, but the link IDs may be aligned first or may be arranged in a descending order.

To trigger a channel state report based on a link, the base station may report, to the terminal, an aperiodic channel state via DCI by using a trigger field shown in Tables 17, 18, and 19.

TABLE 17

| Value of CSI request field | Description |
|---|---|
| '000' | No aperiodic CSI report is triggered |
| '000' | Aperiodic CSI report is triggered for a set of link(s) configured by higher layers for serving cell |
| '010' | Aperiodic CSI report is triggered for a 1$^{st}$ set of link(s) configured by higher layers |
| . . . | . . . |

TABLE 18

| Value of CSI request field | Description |
|---|---|
| '000' | Aperiodic CSI report is triggered for a set of link(s) configured by higher layers for serving cell |
| '001' | Aperiodic CSI report is triggered for a $1^{st}$ set of link(s) configured by higher layers |
| '010' | Aperiodic CSI report is triggered for a $2^{nd}$ set of link(s) configured by higher layers |
| ... | ... |

TABLE 19

| Value of CSI request field | Description |
|---|---|
| '000' | Aperiodic CSI report is triggered for a $1^{st}$ set of link(s) configured by higher layers |
| '001' | Aperiodic CSI report is triggered for a $2^{nd}$ set of link(s) configured by higher layers |
| '010' | Aperiodic CSI report is triggered for a $3^{rd}$ set of link(s) configured by higher layers |
| ... | ... |

Referring to Table 17, the base station may not trigger the aperiodic channel state report by using an indication field, may trigger all links of a corresponding cell, or may trigger, according to the first trigger method described above, links previously triggered for the channel state report via RRC configuration from a bit '010' after a bit '001'. Also, referring to Table 18, a case where the aperiodic channel state report is not triggered in a used trigger field is excluded and in this case, an option of not triggering the aperiodic channel state report may be present in a previous configuration of a trigger field where configuration such as '001' is possible. Referring to Table 19, the degree of freedom of configuration is increased except for aperiodic channel state report configuration in which all links of one cell are reported, thereby providing flexibility to configuration of the base station. Here, as in Table 18, an option of not triggering the aperiodic channel state report may be present in a previous configuration of a trigger field where configuration such as '000' is possible.

Figure 14:
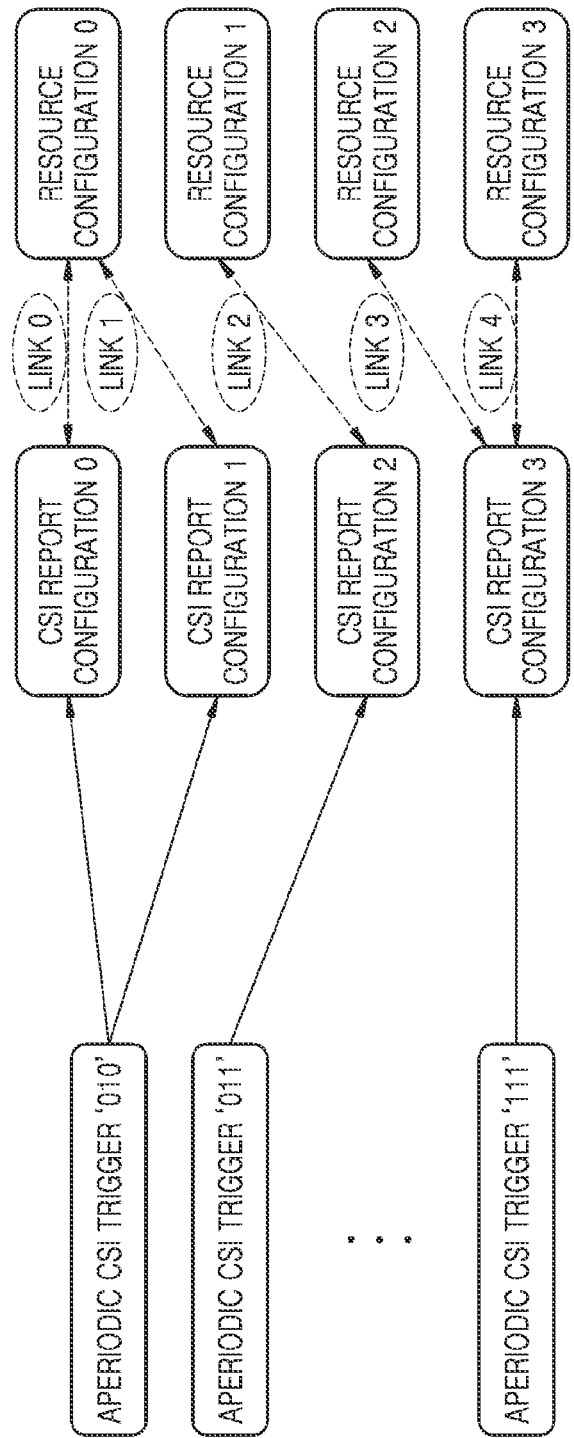
FIG. 14 is a diagram for describing a method of triggering a channel state report configuration in a trigger measurement configuration according to a second aperiodic channel state report trigger method in a 5G or NR system.

FIG. 14 is a diagram for describing a method of triggering a channel state report configuration in a trigger measurement configuration according to the second aperiodic channel state report trigger method in a 5G or NR system.

Referring to FIG. 14, the second aperiodic channel state report trigger method may perform triggering based on channel state report configuration in measurement configuration. A base station may previously configure the channel state report configuration triggered for each trigger field to RRC for an aperiodic channel state report. Here, the base station may directly configure a channel state report configuration ID in trigger configuration to configure the channel state report configuration to be triggered.

Figure 15:
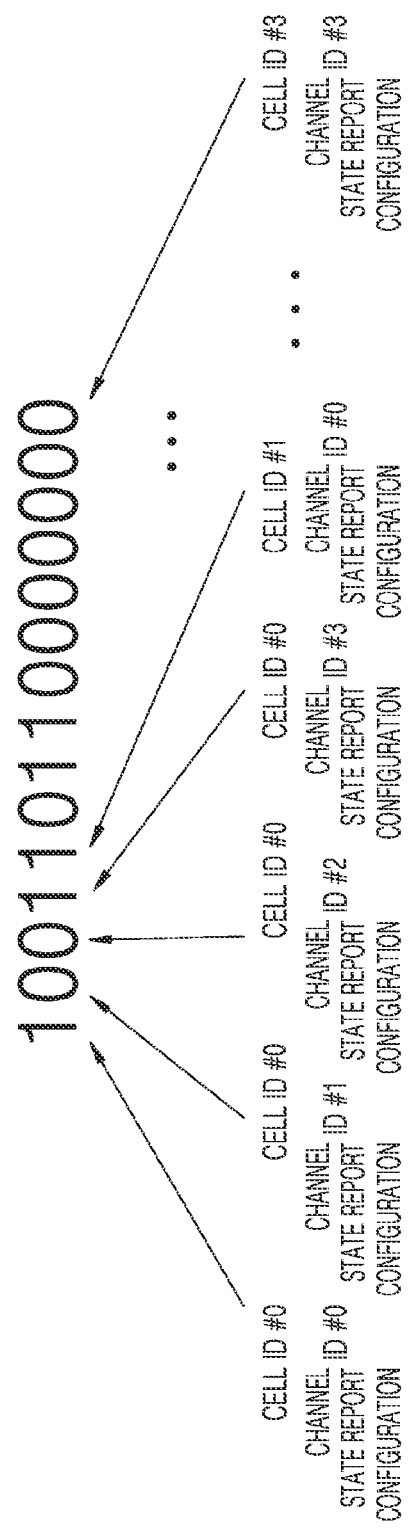
FIG. 15 is a diagram for describing an indication order of a bitmap for a second aperiodic channel state report trigger method in a 5G or NR system.

FIG. 15 is a diagram for describing an indication order of a bitmap for the second aperiodic channel state report trigger method in a 5G or NR system.

Referring to FIG. 15, a base station may configure aperiodic channel state report by using a bitmap of channel state report configurations of all cells configured in a terminal. Here, an indication order of the bitmap may be aligned in an ascending order or a descending order based on cell IDs and channel state report configuration IDs. For example, the cell IDs may be aligned first, and then MSB to LSB may be arranged in an ascending order based on the channel state report configuration IDs in the same cell ID. In FIG. 15, the cell IDs are first aligned, but the channel state report configuration IDs may be aligned first or may be arranged in a descending order.

To trigger a channel state report based on a channel state report configuration, the base station may report, to the terminal, an aperiodic channel state via DCI by using a trigger field shown in Tables 20, 21, and 22.

TABLE 20

| Value of CSI request field | Description |
|---|---|
| '000' | No aperiodic CSI report is tiggered |
| '001' | Aperiodic CSI report is triggered for a set of CSI reporting setting(s) configured by higher layers for serving cell |
| '010' | Aperiodic CSI report is triggered for a $1^{st}$ set of CSI reporting setting(s) configured by higher layers |
| ... | ... |

TABLE 21

| Value of CSI request field | Description |
|---|---|
| '000' | Aperiodic CSI report is triggered for a set of CSI reporting setting(s) configured by higher layers for serving cell |
| '001' | Aperiodic CSI report is triggered for a $1^{st}$ set of CSI reporting setting(s) configured by higher layers |
| '010' | Aperiodic CSI report is triggered for a $2^{nd}$ set of CSI reporting setting(s) configured by higher layers |
| ... | ... |

TABLE 22

| Value of CSI request field | Description |
|---|---|
| '000' | Aperiodic CSI report is triggered for a $1^{st}$ set of CSI reporting setting(s) configured by higher layers |
| '001' | Aperiodic CSI report is triggered for a $2^{nd}$ set of CSI reporting setting(s) configured by higher layers |
| '010' | Aperiodi CSI report is triggered for a $3^{rd}$ set of CSI reporting setting(s) configured by higher layers |
| ... | ... |

Referring to Table 20, the base station may not trigger the aperiodic channel state report by using an indication field, may trigger all channel state report configurations of a corresponding cell, or may trigger, according to the second trigger method described above, channel state report configurations previously triggered for the channel state report via RRC configuration from a bit '010' after a bit '001'. Also, referring to Table 21, a case where the aperiodic channel state report is not triggered in a used trigger field is excluded and in this case, an option of not triggering the aperiodic channel state report may be present in a previous configuration of a trigger field where configuration such as '001' is possible. Referring to Table 22, the degree of freedom of configuration is increased except for aperiodic channel state report configuration in which all channel state report configurations of one cell are reported, thereby providing flexibility to configuration of the base station. Here, as in Table 21 described above, an option of not triggering the aperiodic channel state report may be present in a previous configuration of a trigger field where configuration such as '000' is possible.

Figure 16:
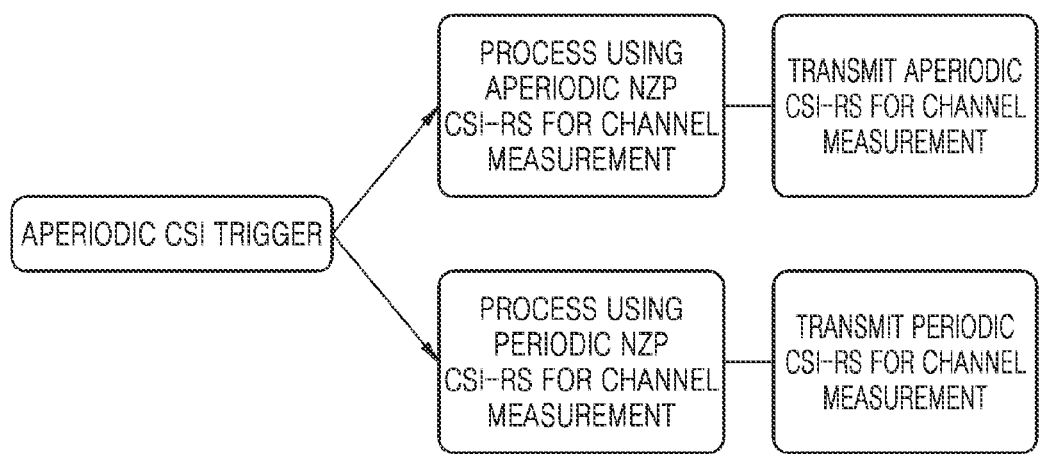
FIG. 16 is a diagram for describing a method of indirectly indicating aperiodic CSI-RS by using an aperiodic channel state report indication field in a 5G or NR system.

FIG. 16 is a diagram for describing a method of indirectly indicating aperiodic CSI-RS by using an aperiodic channel state report indication field in a 5G or NR system.

It is possible to indirectly indicate aperiodic CSI-RS for channel measurement and interference measurement by using an indication field. Referring to FIG. 16, a base station triggers a channel state report by using a link. Here, when a resource supported for the channel measurement in resource configuration connected to the link is periodic CSI-RS, an aperiodic channel state report may be performed based on a channel measured in an existing periodic CSI-RS resource. Also, when the resource supported for the channel measurement in resource configuration connected to the link is aperiodic CSI-RS, the aperiodic channel state report may be performed based on a channel measured in aperiodic CSI-RS resource. Here, aperiodic channel state report trigger and the aperiodic CSI-RS may be transmitted always from the same slot or subframe. Also, trigger may be performed via channel state report configuration instead of the link as described above.

To support the channel state report, resources for desired signal and interference measurement may be configured in a terminal via the resource configuration shown in FIG. 11A. RRC parameters of Table 23 may be considered for the resource configuration.

TABLE 23

| Parameter name | Description | Vaule range |
| --- | --- | --- |
| CSI-RS-ResourceConfig | CSI-RS resource configuration | |
| CSI-RS- ResourceConfigId | CSI-RS resource configuration ID | 0 . . . CSI-RS-ResourceMax − 1 |
| ResourceConfigType | Time domain behavior of resource configuration | aperiodic, semi-persistent, or periodic |
| CSI-RS-timeConfig | Contains periodicity and slot offset for periodic/semi-persistent CSI-RS | |
| NrofPorts | Number of ports | 1, 2, 4, 8, 12, 16, [24], 32 |
| CSI-RS-ResourceMapping | Include parameters to capture OFDM symbol and subcarrier occupancy of the CSI-RS resource within a slot | |
| CDMType | Includes parameters to capture CDM value (1, 2, 4, or 8), CDM pattern (freq only, time and freq, time only) | |
| CSI-RS-Density | Density of CSI-RS resource measured in RE/port/PRB | e.g., 1/2, 1, >1 |
| CSI-RS-FreqBand | Includes parameters to enbale configuration of wideband and partial band CSI-RS | |
| Pc | Power offset of NZP CSI-RS RE to PDSCH RE | |
| ScramblingID | Scambling ID | |

Referring to Table 23, in the 5G or NR system, beam measurement, report, and management may be supported based on the resource configuration. Also, in the 5G or NR system, MIMO supports a large number, for example, 1024 antennas and a high frequency band of 30 GHz. Wireless communication using such millimeter waves shows high straightness and a high path loss due to characteristics of a band, and in order to overcome this, hybrid beamforming in which analog beamforming based on radio frequency (RF) and antenna and digital beamforming based on digital precoding are combined is required. This will be described with reference to FIG. 17.

Figure 17:
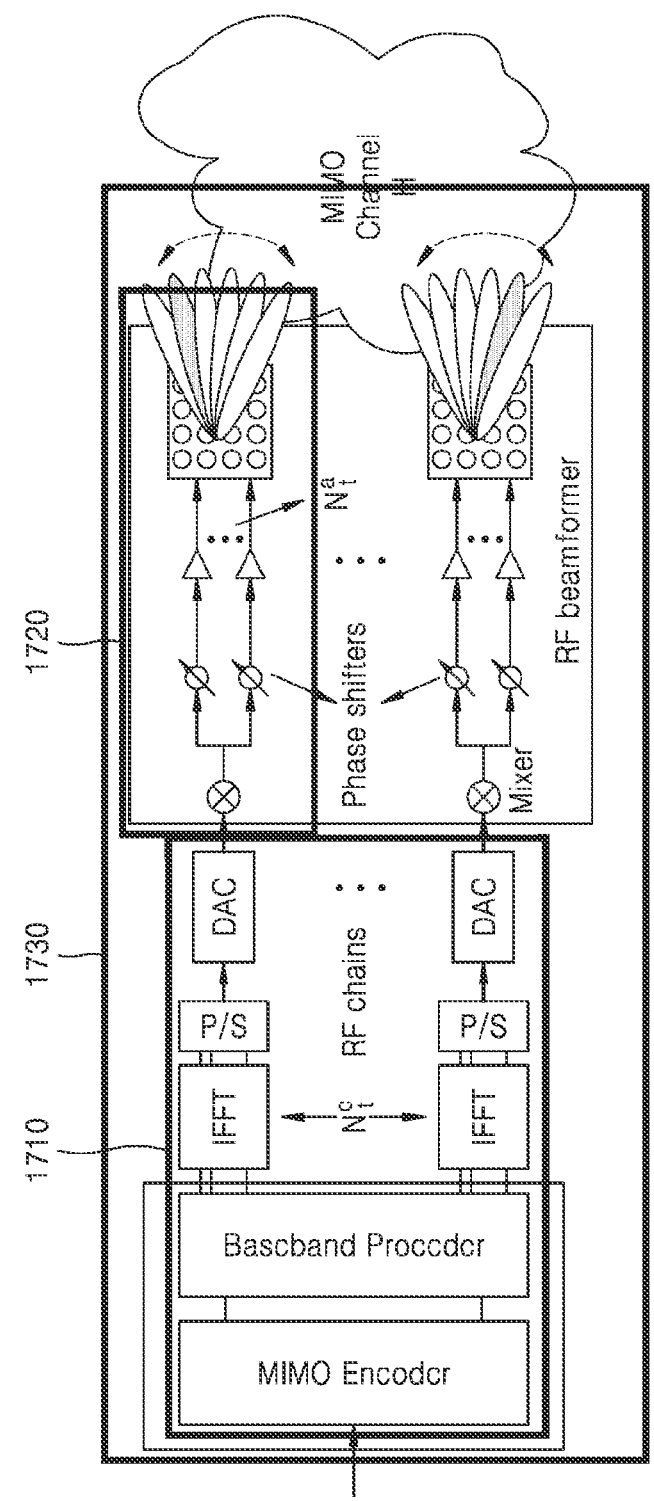
FIG. 17 is a diagram showing a hybrid beamforming structure according to an embodiment.

FIG. 17 is a diagram showing a hybrid beamforming structure according to an embodiment.

Unlike an LTE/LTE-A system operated in a band less than or equal to 6 GHz, an operating band of a 5G or NR system may expand to a high frequency band up to 100 GHz. With the increase of a frequency band, attenuation of a channel exponentially increases, and thus a method for overcoming the attenuation is required in the high frequency band. Beamforming is the method for efficiently overcoming the attenuation of the channel in the high frequency band without largely increasing the number of base stations.

Referring to FIG. 17, the base station and a terminal includes an RF chain and a phase shifter for digital beamforming 1710 and analog beamforming 1720. Analog beamforming at a transmitting side may be performed via a method of focusing a signal transmitted from each antenna in a specific direction by changing a phase of the signal by using a plurality of antennas and a phase shifter. In this regard, an array antenna in which a plurality of antenna elements are arranged is used. By using such transmission beamforming, a propagation distance of the signal may be increased and the signal is barely transmitted to a direction other than the set direction, and thus interference to other users is greatly reduced. At a receiving side as well, reception beamforming may be performed by using a reception array antenna. The reception beamforming also increases the sensitivity of a signal received from a specific direction by focusing reception of propagation in the specific direction, and block an interference signal by excluding a signal received from a direction other than the specific direction as a reception signal.

Meanwhile, because spacing between antennas required for the analog beamforming is proportional to wavelength of a carrier wave, an antenna array form factor may be greatly improved when a frequency band is increased. Accordingly, a wireless communication system operating in the high frequency band is advantageous in applying a beamforming technology because a relatively high antenna gain may be obtained compared to using a beamforming technology in a low frequency band.

In such a beamforming technology, to obtain the higher antenna gain, a hybrid beamforming 1730 in which analog beamforming and digital precoding used to obtain a high data rate effect in an existing multi-antenna system are incorporated is used. In the hybrid beamforming 1730, when one or more analog beams are formed via beamforming, a more reliable signal may be transmitted or received or higher system capacity may be expected by applying precoding similar to that applied to an existing multi-antenna to a baseband.

In the present disclosure, when a base station and a terminal supports analog, digital, or hybrid beamforming, a method of measuring quality of a beam according to beam switching capability of the base station and the terminal, and reporting and using information about the measured quality of the beam will be described.

The most important factor in applying beamforming is to select a beam direction optimized to the base station and the terminal. To select the optimized beam direction, the base station and the terminal may support beam weeping using a plurality of time and frequency resources. A beam sweeping operation of the terminal and base station will be described with reference to FIGS. 18 through 20.

Figure 18:
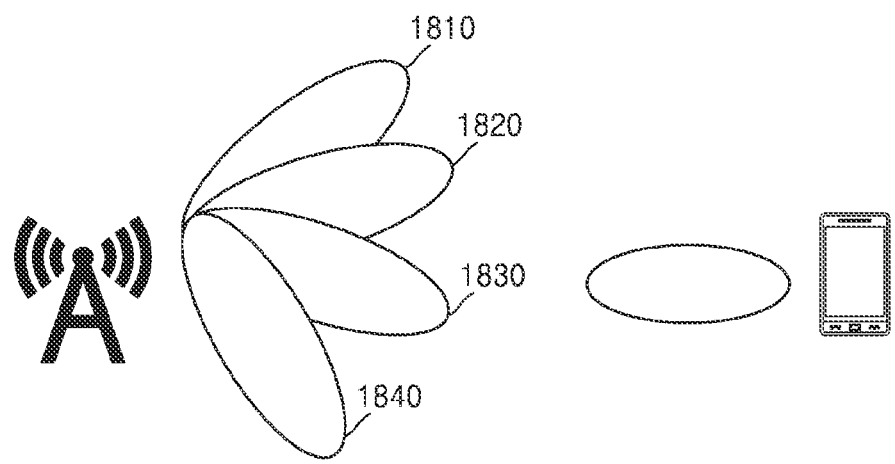
FIGS. 18 and 19 are diagrams for describing a beam sweeping operation of a base station and a terminal, according to an embodiment.
Figure 19:
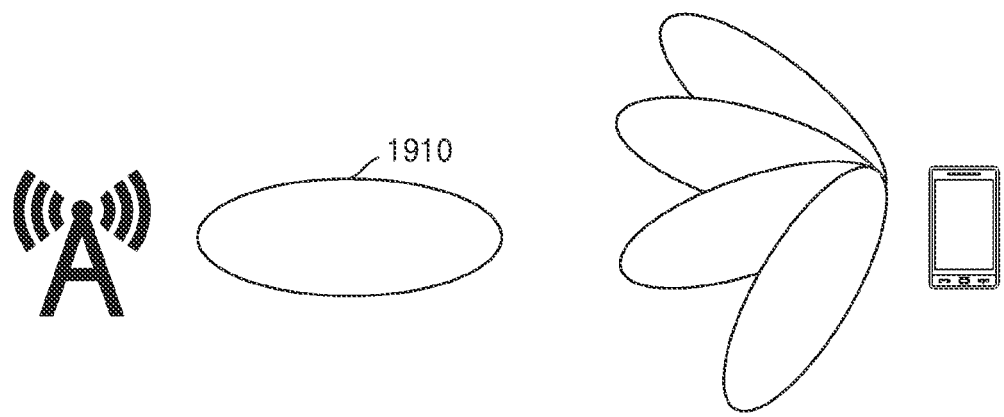

FIGS. 18 and 19 are diagrams for describing a beam sweeping operation of a base station and a terminal, according to an embodiment.

Referring to FIG. 18, the base station may transmit, to the terminal, a plurality of transmission beams 1810 through 1830 for transmission beam selection of the base station. The terminal may determine a beam suitable for communication with the corresponding terminal among transmission beams received from the base station, and notify corresponding information to the base station. Here, the beam suitable for communication may denote a beam suitable or optimal for transmitting data.

Referring to FIG. 19, the base station may repeatedly transmit the same transmission beam 1910 for reception beam selection of the terminal. The terminal may determine a reception beam for each transmission beam based on the repetitive transmission of the same transmission beam 1910, and notify corresponding information to the base station or use a reception beam determined according to the transmission beam indicated by the base station.

Figure 20:
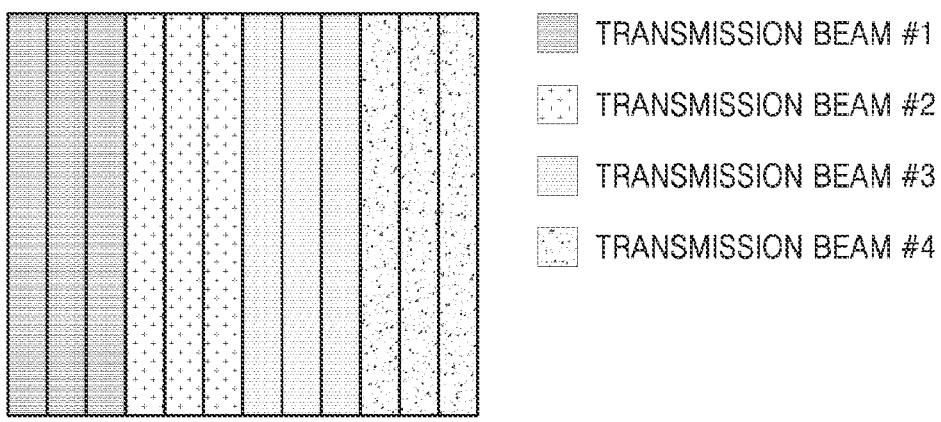
FIG. 20 is a diagram showing reference signal transmission for beam selection of a base station or a terminal, according to an embodiment.

FIG. 20 is a diagram showing reference signal transmission for beam selection of a base station or a terminal, according to an embodiment.

Referring to FIG. 20, a base station or terminal at a transmitting end may transmit a plurality of different transmission beams by using different time resources in terms of a time axis for beam selection of a terminal or base station at a receiving end. Upon receiving the transmission beam, the terminal or base station may measure quality of a reference signal by using CSI, reference signal received power (RSRP), or the like, based on the received transmission beam, and select one or more transmission beams or reception beams based on a result thereof. In FIG. 20, a reference signal based on different beams is transmitted via different time resources, but the method may be equally applied to a frequency, a cyclic shift, and a code resource.

According to an embodiment, a plurality of transmission beams may be transmitted for transmission beam sweeping, and one transmission beam may be repeatedly applied and transmitted for reception beam sweeping. In FIG. 20, four transmission beams, i.e., transmission beam #1, transmission beam #2, transmission beam #3, and transmission beam #4 are repeatedly transmitted three times. However, this is only an example, and an embodiment is not limited thereto and various numbers of transmission beams may be repeatedly transmitted in various number of times.

The terminal may determine a reception beam of the corresponding terminal for each transmission beam based on such repetitive transmission, and notify the reception beam to the base station or use the reception beam determined according to the transmission beam indicated by the base station.

According to an embodiment, a beam management operation such as beam sweeping may be operated based on a channel state report framework (resource configuration, CSI report configuration, CSI measurement configuration, and link) and periodic, semi-persistent, aperiodic CSI-RS transmission and channel state report or beam report described above with reference to FIGS. 11 through 16.

With respect to a 5G or NR system supporting a channel state report or beam report, to transmit a plurality of beams for transmission beam sweeping or repeatedly transmit one transmission beam for reception beam sweeping, a plurality of CSI-RS resources may be configured in a CSI-RS resource set in resource configuration and it may be configured whether a corresponding CSI-RS resource is an individual CSI-RS resource or the same repetitive CSI-RS resource. For such configuration RRC configuration parameters of Table 24 may be provided.

TABLE 24

| Parameter name | Description | Vaule range |
| --- | --- | --- |
| ResourceSetConfigList | Contains up to ResourceSetMax resource set configurations (ResourceSetConfig) | |
| ResourceSetConfig | Resource set configuration | |
| ResourceSetConfigId | Resource set configuration ID | 0 . . ResourceSetMax − 1 |
| CSI-RS-ResourceConfigList | Contains up to CSI-RS-ResourcePerSetMax CSI-RS resource configurations (CSI-RS-ResourceConfig) | |
| CSI-RS ResourceRepetitionConfig | Configuration of CSI-RS resource repetition ON/OFF | |

Referring to Table 24, ResourceSetConfigList is configuration for configuring a plurality of CSI-RS resource sets. In such configuration, the plurality of CSI-RS resource sets may be configured, and individual CSI-RS resource set may be individually configured via ResourceSetConfig. ResourceSetConfig may include configurations of ResourceSetConfigId, CSI-RS-ResourceConfigList, and CSI-RS ResourceRepetitionConfig. Here, ResourceSetConfigId may configure ID for the CSI-RS resource set configuration and CSI-RS-ResourceConfigList may configure IDs of CSI-RS resources configured in the CSI-RS resource set based on the IDs of CSI-RS resources described in Table 23 such that the CSI-RS resource configured in the CSI-RS resource set may be indicated. CSI-RS ResourceRepetitionConfig may configure whether the CSI-RS resources configured in the CSI-RS resource set will be transmitted based on beams having different individual CSI-RS resources for transmission beam sweeping or whether individual CSI-RS resources will repeatedly support the same CSI-RS resource. Here, CSI-RS ResourceRepetitionConfig may be represented as BeamRepetitionConfig to indicate whether the CSI-RS resource set supports the same beam.

With respect to configuring whether to support repetition of the CSI-RS resource in the CSI-RS resource set configuration, only 1 port CSI-RS, or 1 or 2 port CSI-S resource may be configured for each CSI-RS resource. While performing the transmission beam sweeping and the reception beam sweeping described with reference to FIGS. 18 through 20, as much transmission beams as the number of antennas (for example, 1024) may be transmitted and more transmission beams may be transmitted considering the reception beam sweeping. Accordingly, in relation to the CSI-RS resource configuration required for beam sweeping, by limiting the number of antenna ports to a resource up to 1 port or 2 ports, it is possible to reduce overhead required for transmission of a reference signal and efficiently support efficient beam management.

Also, with respect to configuring whether to support CSI-RS resource repetition in the CSI-RS resource set, when OFDM symbols in which the CSI-RS resource is transmitted according to CSI-RS-ResourceMapping configuration of each CSI-RS resource are the same, repetitive configuration of the CSI-RS resource may not be allowed or the terminal may ignore the corresponding configuration. This is because, when the terminal sweeps a plurality of reception beams, it is difficult to use the CSI-RS in the same OFDM symbol while measuring quality of different reception beams.

In addition, during the CSI-RS resource repetition, other configurations excluding CSI-RS-ResourceMapping configuration, i.e., ResourceConfigType, CSI-RS-timeConfig, NrofPorts, CDMType, CSI-RS-Density, CSI-RS-FreqBand, $P_C$, and ScramblingID, may not be allowed to be configured differently for each CSI-RS resource or may be ignored by the terminal. This is because, when the terminal sweeps a plurality of reception beams, it may be difficult to relatively compare RSRP or CQI for beam measurement when densities of CSI-RS are different. Also, when one CSI-RS resource is frequently transmitted and another resource is not frequently transmitted due to different transmission periods, reception beam sweeping required by the terminal may not be intactly performed. In addition, when boosting $P_C$ of the CSI-RS power or CSI-RS-FreqBand that is a transmission frequency band are differently set for transmission of the same beam, RSRP for each reception beam may become different and the accuracy may be decreased even when the terminal corrects the RSRP. Accordingly, during CSI-RS resource repetition for reception beam sweeping, configuration of the CSI-RS resource included in the CSI-RS resource set may be restricted to efficiently perform the reception beam sweeping operation of the terminal and reduce complexity of hardware implementation of the terminal.

Figure 21:
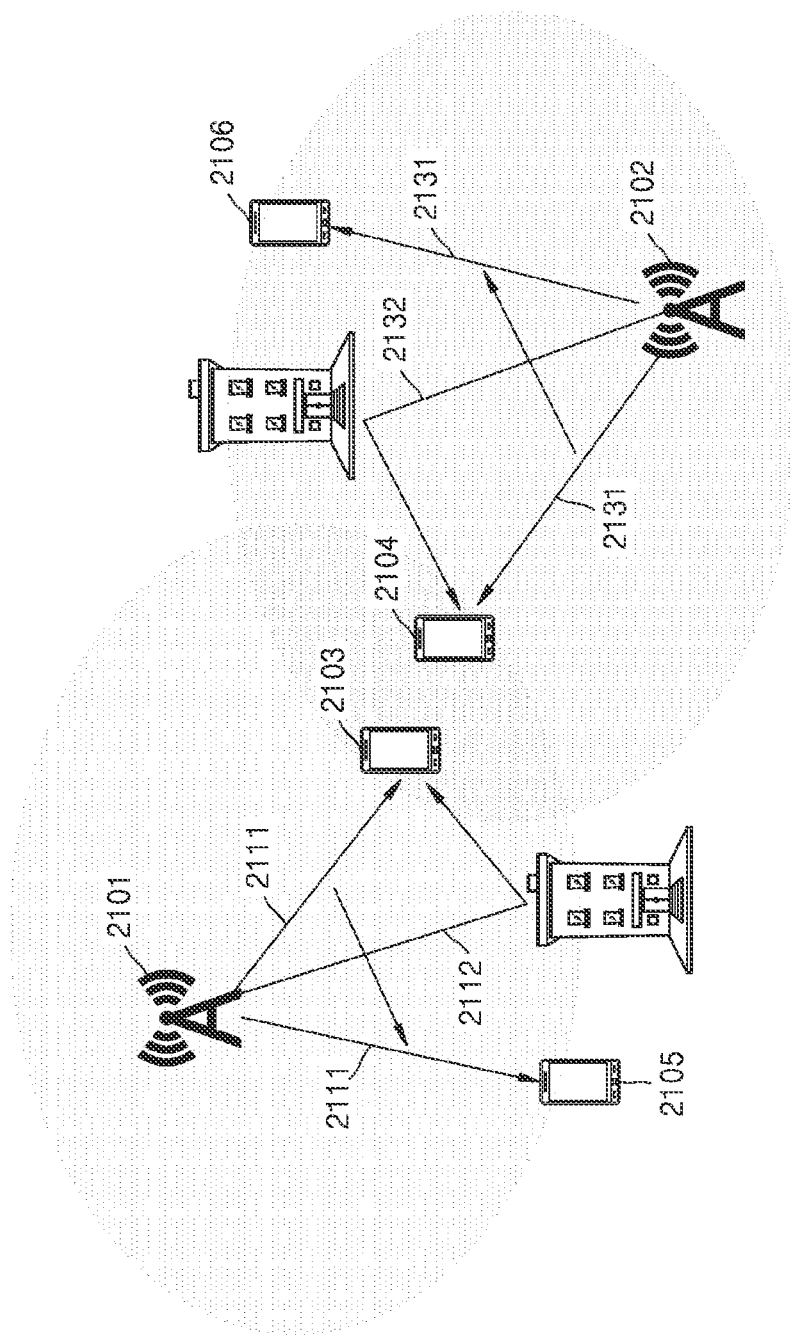
FIG. 21 is a diagram for describing beam management in an access cell (downlink) and beam management considering other neighboring cells, according to an embodiment.

In the 3GPP NR Release 15 Phase-I standard, two or up to four CSI-RS resource indicator or CSI-RS resource set indicator (CRI) and L1-RSRP reports are supported based on the CSI-RS resource and resource set in the resource configuration configured in the terminal. In the LTE system, RSRP is a linear average of a DL reference signal transmitted in a channel bandwidth, and is for reporting, to the base station, an index of a CSI-RS resource or resource set where high RSRP is measured and a measured power value of the corresponding resource or resource set, by measuring the strength of a related reference signal transmitted to the terminal. Such an RSRP-based beam measurement report may not be problematic when only a beam supported by a corresponding cell to which the terminal is accessing is considered, but may not operate smoothly when other adjacent cells are considered. FIG. 21 is a diagram showing beam management in such an access cell and beam management considering other neighboring cells.

Figure 22:
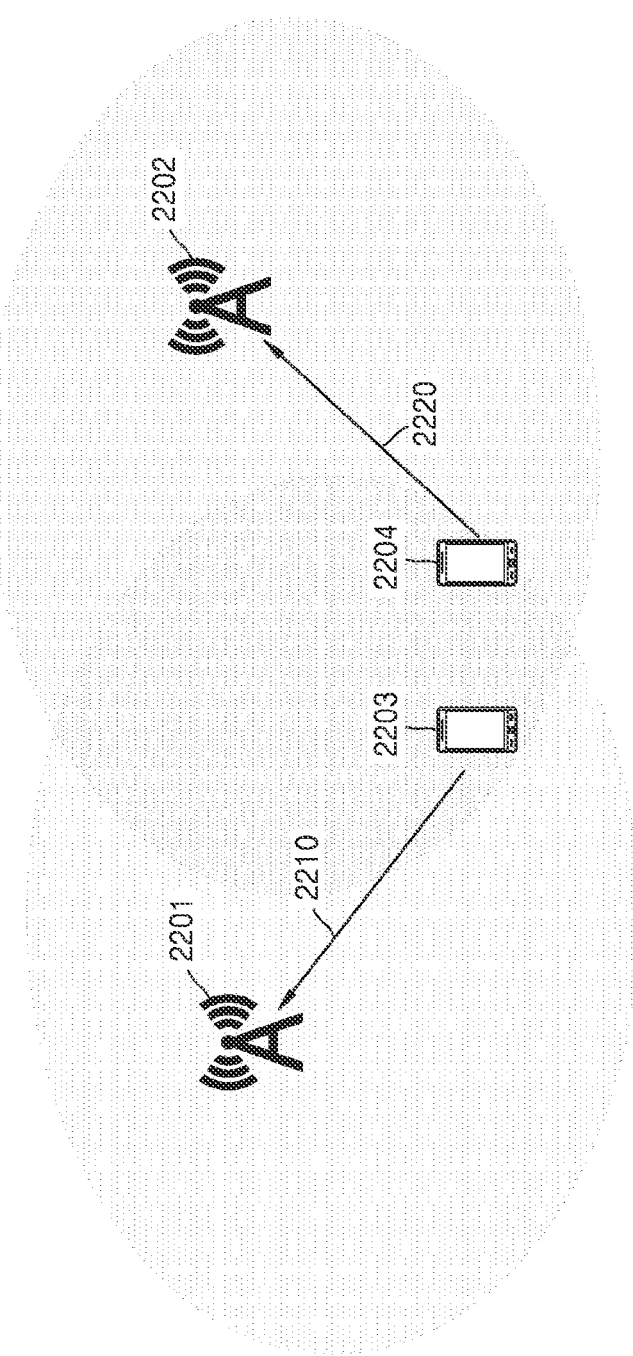
FIG. 22 is a diagram for describing beam management in uplink and beam management considering other neighboring cells, according to an embodiment.
Figure 23:
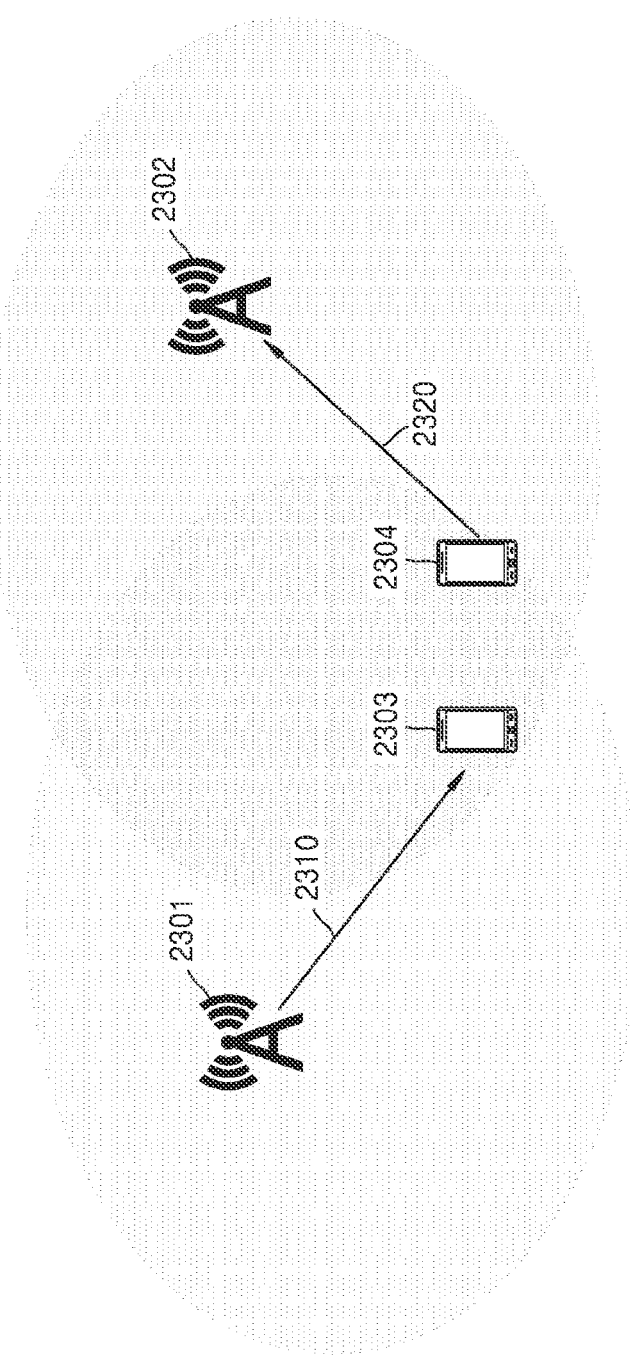
FIG. 23 is a diagram for describing beam management in cross-link and beam management considering other neighboring cells, according to an embodiment.

FIGS. 21 through 23 are diagrams for describing beam management considering other neighboring cells in DL, UL, and cross-link, according to an embodiment.

When a base station and a terminal support RSRP-based beam management and report, highest RSRP is mostly measured in beams close to a line of sight (LOS) and the terminal reports such beams to the base station. However, when a signal of another cell is considered, the beam having the highest RSRP may cause high interference to the terminal of another cell, thereby deteriorating an entire wireless communication system. Accordingly, it may be better to transmit PDSCH via another beam direction or transmit PDSCH to another terminal by using a corresponding beam considering interference of another cell.

Referring to FIG. 21, terminals 2103 and 2104 are terminals positioned on LOS respectively with base stations 2101 and 2102. Thus, high RSRP may be measured for the terminals 2103 and 2104, respectively from beams 2111 and 2131 close to LOS with the base stations 2101 and 2102. However, the beams 2111 and 2131 interfere with each other, thereby deteriorating communication performance of the terminals 2103 and 2104. Accordingly, the base stations 2101 and 2102 may perform communication by respectively using beams 2112 and 2132 in other directions or may use the beams 2111 and 2131 to communicate with other terminals 2105 and 2106 to obtain higher performance.

Accordingly, to select a beam while considering even interference from another cell during beam selection of a terminal, a report of reference signal received quality (RSRQ) or signal-to-interference-and-noise-ratio (SINR) may be required instead of existing RSRP.

FIG. 21 shows a case in DL, but such a problem may be considered also in UL and cross-link.

Referring to FIG. 22, interference may occur even between UL beams 2210 and 2220 transmitted by adjacent terminals 2203 and 2204 to base stations 2201 and 2202, respectively. Also, referring to FIG. 23, interference may occur between a DL beam 2310 and an UL beam 2320 received and transmitted by adjacent terminals 2303 and 2304 from base stations 2301 and 2302, respectively.

In addition, a D2D environment may also consider such a problem.

As described above, RSRQ may be used for beam management considering other neighboring cells. In the LTE system, RSRQ may be defined as Equation 2 below.

$$RSRQ = \frac{RSRP}{RSSI} * N \qquad \text{[Equation 2]}$$

Here, RSSI is entire wideband power received by the terminal, and is a value measured only in OFDM symbol including a reference signal and including power transmitted from a serving cell and interference and noise transmitted from the same channel together. Also, N is an integer indicating a bandwidth (RB number) where a reference signal is transmitted for measurement of the reference signal. According to Equation 2, RSRQ is a value obtained by dividing strength of a signal transmitted to the terminal by power of a signal including interference and noise together.

However, in the case of beam cooperative communication, a signal is transmitted according to a combination of individual beams, and thus a transmission power ratio according to a reference signal for each beam is required instead of entire transmission power, and accordingly, RSRQ according to Equation 2 is not suitable for beam cooperative communication.

According to an embodiment, for the beam cooperative communication, a new concept of RSRQ may be used instead of existing RSRQ for the terminal to report to the base station. Such a new concept of RSRQ may be referred to by a term such as a beam quality indicator (BQI), a beam indicator (BI), RS-SINR, CSI-RS SINR, or synchronization signal block-SINR (SSB-SINR). Such RSRQ, BQI, BI, RS-SINR, CSI-RS SINR, or SSB-SINR may be defined according to Equation 3.

$$RSRQ = \frac{RSRP_D}{RSRP_I} * N \qquad \text{[Equation 3]}$$

Here, $RSRP_D$ denotes reception power measured from a reference signal with respect to a desired channel to be received from a base station or another terminal by a terminal, and $RSRP_I$ denotes reception power measured from a reference signal with respect to an interference channel received from another base station or terminal by a terminal. Such a new concept of RSRQ may be referred to by various terms, such as BQI, BI, RS-SINR, CSI-RS SINR, or SSB-SINR. Here, bandwidths for reference signal transmission may be restricted to be all same for transmission of reference signals transmitted for measurement and report, and in this case, a variable N for a transmission bandwidth may not be required.

Hereinabove, a method of using RSRQ, BQI, BI, RS-SINR, CSI-RS SINR, or SSB-SINR in the beam cooperative communication has been described, but CQI may also be used for quality measurement, and in this case, RI, PMI, and CQI may be reported together. A detailed reporting operation may be the same as or similar to RSRQ, BQI, BI, RS-SINR, CSI-RS SINR, or SSB-SINR described above.

According to an embodiment, for reporting for beam cooperative communication a plurality of beams need to be transmitted with respect to transmission of not only a reference signal regarding a desired channel as defined in Equation 3, but also a reference signal regarding an interference channel.

Figure 24:
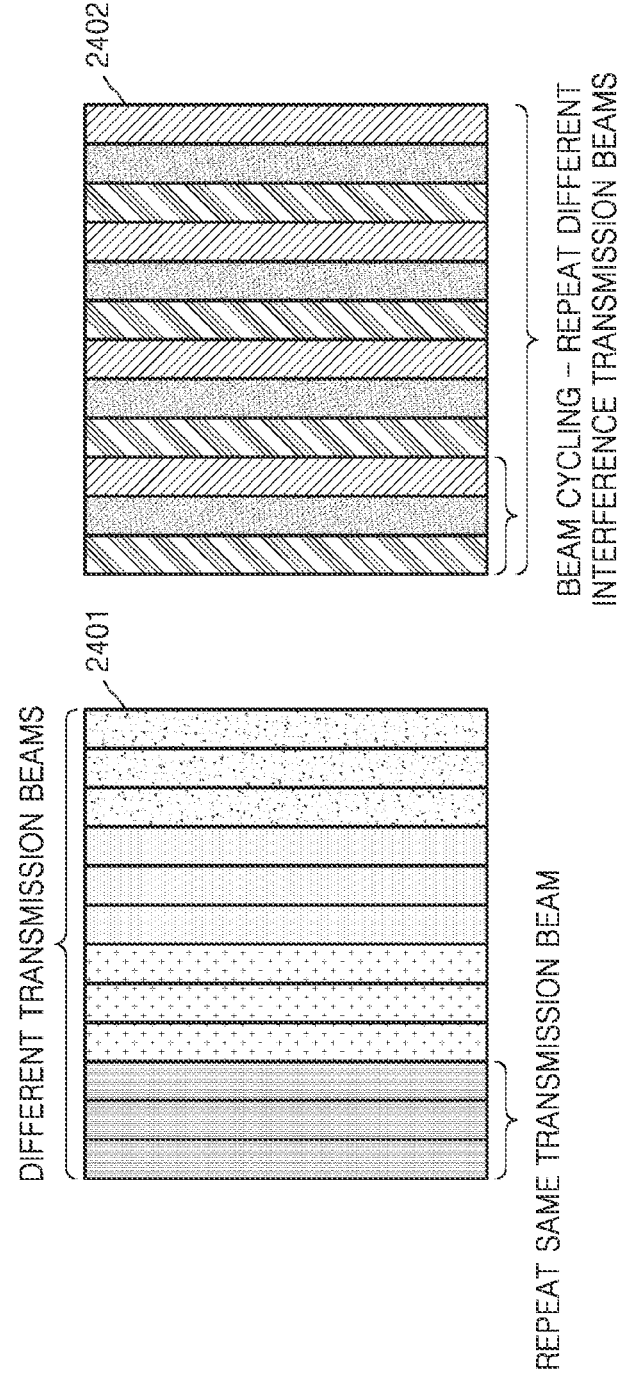
FIG. 24 is a diagram for describing a beam-based quality measurement method according to an embodiment.

FIG. 24 is a diagram for describing a beam-based quality measurement method according to an embodiment.

Referring to FIG. 24, a terminal may receive a reference signal supporting beam transmission with respect to a desired channel 2401 and an interference channel 2402. Beam quality may be measured and calculated according to Equation 4 and reported to a base station via reference signals for the desired channel 2401 and the interference channel 2402 supporting different transmission beam transmission and same transmission beam repetitive transmission.

$$RSRQ_1 = \frac{P_1}{I_1} * N_1,$$
$$RSRQ_2 = \frac{P_2}{I_2} * N_2, \ldots, RSRQ_M = \frac{P_M}{I_M} * N_M$$

[Equation 4]

Referring to FIG. 24 and Equation 4, the terminal may measure reception power of each of the desired channel 2401 and the interference channel 2402, and calculate quality of a beam combination via a power ratio regarding a combination of the desired channel 2401 and the interference channel 2402. According to an embodiment, as shown in FIG. 24, a wireless communication system may support reference signal configuration capable of supporting transmission of a plurality of transmission beams and repetitive transmission of the same beam in the interference channel 2402 for interference measurement. In particular, a plurality of CSI-RS resources or a CSI-RS resource set may be configured in resource configuration for interference measurement, and the transmission of a plurality of transmission beams and/or the repetitive transmission of the same beam may be supported. A 5G or NR system may support interference measurement via zero power (ZP) CSI-RS and non-zero power (NZP) CSI-RS and may configure a plurality of resources, but does not support an operation of selecting a beam by measuring power of an interference beam.

According to an embodiment, a terminal measurement and reporting operation considering a plurality of beams may be directly configured via an RRC field. The RRC field may be configured for each terminal or may be configured for each channel state report configuration of the terminal.

Also, the terminal measurement and reporting operation considering the plurality of beams may be indirectly configured via the RRC field. For example, the terminal measurement and reporting operation considering the plurality of beams may be considered by configuring an interference measurement resource for beam cooperative communication or by configuring a channel state report configuration to report RSRQ, BQI, BI, RS-SINR, CSI-RS SINR, or SSB-SINR-based channel state.

Hereinabove, a method of using RSRQ, BQI, BI, RS-SINR, CSI-RS SINR, or SSB-SINR in the beam cooperative communication has been described, but CQI may also be used for quality measurement, and in this case, RI, PMI, and CQI may be reported together. A detailed reporting operation may be the same as or similar to RSRQ, BQI, BI, RS-SINR, CSI-RS SINR, or SSB-SINR described above.

When the channel state report for cooperative communication according to an embodiment is configured, the terminal may also support a CRI report. An existing CRI report reports an index of CSI-RS resource or CSI-RS resource set in which RSRP or RI/CQI measured by a terminal is measured or calculated to be the highest. In comparison, when the channel state report for beam cooperative communication is configured, a desired channel reference signal and interference channel reference signal resource combination in which RSRQ, BQI, BI, RS-SINR, CSI-RS SINR, or SSB-SINR is measured to be the highest may be reported. Also, an RSRQ report may be associated with a CRI report order. In addition, it may be possible to report an average RSRQ, one or more maximum RSRQ, and one or more minimum RSRQ, together with CRI.

Hereinabove, a method of using RSRQ, BQI, BI, RS-SINR, CSI-RS SINR, or SSB-SINR in the beam cooperative communication has been described, but CQI may also be used for quality measurement, and in this case, RI, PMI, and CQI may be reported together. A detailed reporting operation may be the same as or similar to RSRQ, BQI, BI, RS-SINR, CSI-RS SINR, or SSB-SINR described above.

According to an embodiment, two methods may be considered to configure a reference signal transmission time point for desired channel reference signal and interference channel reference signal measurement.

First configuration method of reference signal transmission time point for desired channel reference signal and interference channel reference signal: Method of transmitting always at same time point Second configuration method of reference signal transmission time point for desired channel reference signal and interference channel reference signal: Method of transmitting at different time points FIG. 25 is a diagram for describing a method of transmitting reference signal transmission time points for measuring desired channel and interference channel reference signals always at the same time point, according to an embodiment.

Figure 25:
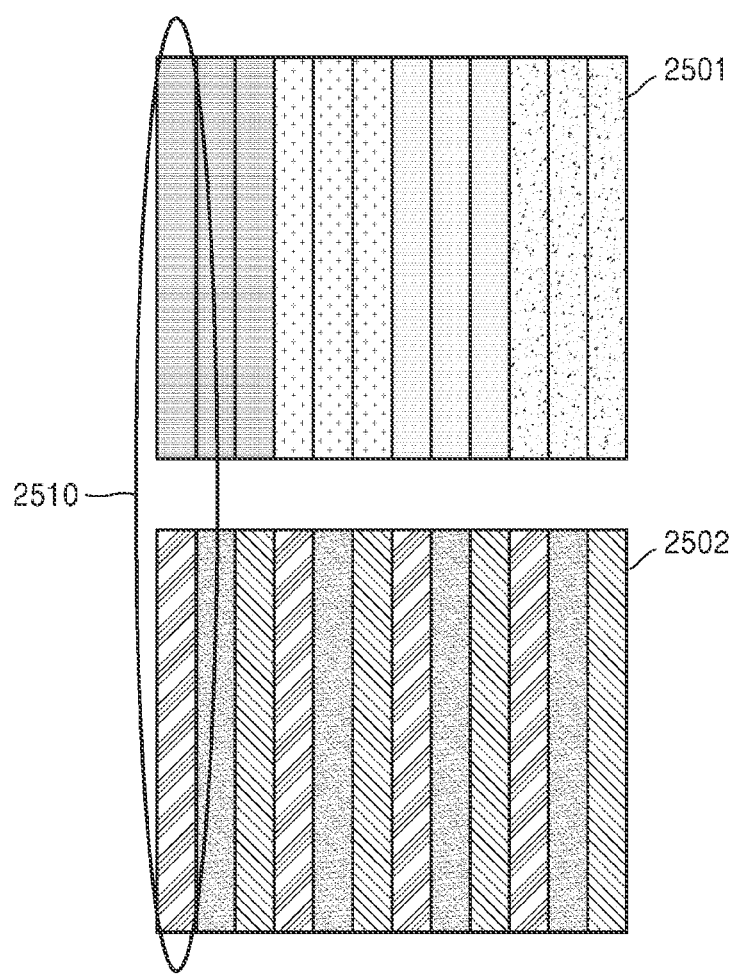
FIG. 25 is a diagram for describing a method of transmitting reference signal transmission time points for measuring desired channels and interference channel reference signals always at the same time point, according to an embodiment.

Referring to FIG. 25, a reference signal transmission time point for a desired channel 2501 and a reference signal transmission time point for an interference channel 2502 may be configured to be always the same as indicated by a reference numeral 2510, beam cooperative communication may be supported while minimizing terminal implementation and standard complexity. For example, when a reference signal transmission time point for a desired channel and a reference signal transmission time point for an interference channel are different, a reception beam of a terminal may vary based on a transmission time point, and additional standard support and terminal implementation may be required accordingly. Thus, by configuring the reference signal transmission time point for the desired channel 2501 and the reference signal transmission time point for the interference channel 2502 to be always the same as indicated by the reference numeral 2510, the standard support and terminal implementation complexity for reception beams may be reduced, thereby effectively measuring a reference signal.

According to an embodiment, because the numbers of times the desired channel 2501 and the interference channel 2502 are transmitted need to be the same, the total number of CSI-RS resources may be restricted to be the same in the CSI-RS resource number, CSI-RS resource set number, or entire CSI-RS resource set for reference signal measurement, and otherwise, the terminal may ignore such configuration or ignore partial reference signal configuration or resource not transmitted at the same time point.

Figure 26:
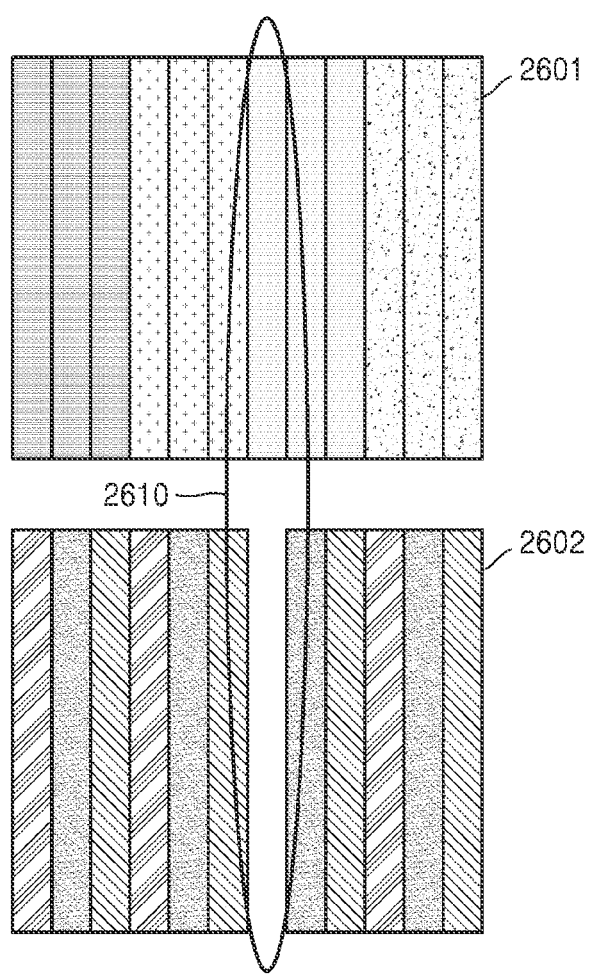
FIG. 26 is a diagram showing an operation of a terminal when the number of interference channels is smaller than the number of desired channels, according to an embodiment.

FIG. 26 is a diagram showing an operation of a terminal when the number of interference channels is smaller than the number of desired channels, according to an embodiment.

Referring to FIG. 26, the number of interference channels 2602 may be smaller than the number of desired channels 2601. Accordingly, there may be a time point 2610 when a reference signal is not received via the interference channel 2602. At the time point 2610 when the reference signal is not transmitted via the interference channel 2602, reporting may be performed considering only RSRP of a beam instead of quality of the beam. On the other hand, when the number of desired channels 2601 is smaller than the number of interference channels 2602, reporting may be performed considering RSRP of the interference channel 2602 as the desired channel 2601 or the interference channel 2602 at a corresponding time point may be ignored. In addition, when the numbers of reference signal resources configured in the desired channel 2601 and the interference channel 2602 are different, measurement and reporting may be performed based on the maximum number of resources.

Figure 27:
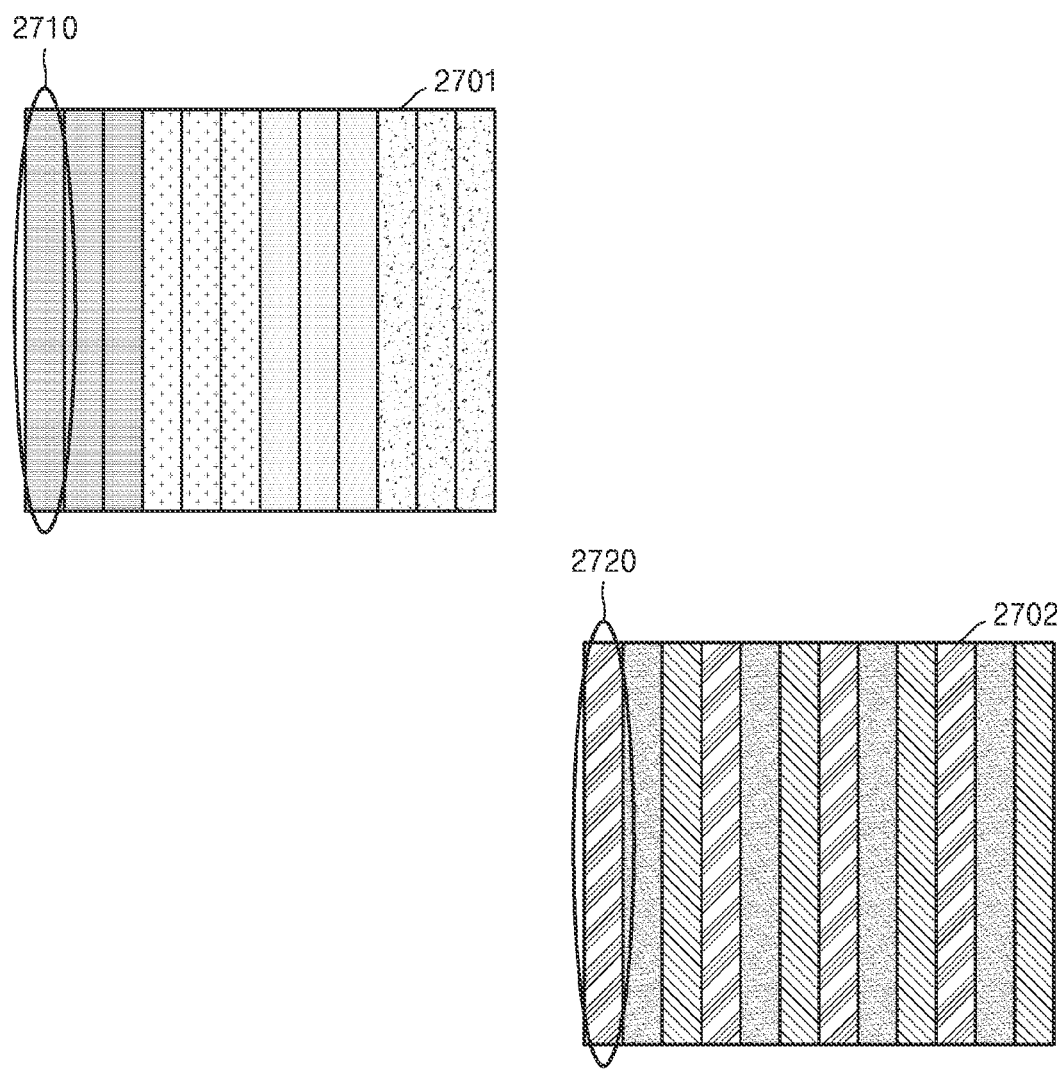
FIG. 27 is a diagram for describing a method of allowing reference signal transmission time points for measuring desired channels and interference channel reference signals to be transmitted at different time points, according to an embodiment.

FIG. 27 is a diagram for describing a method of allowing reference signal transmission time points for measuring desired channel and interference channel reference signals to be transmitted at different time points, according to an embodiment.

Referring to FIG. 27, a reference signal transmission time point 2710 for a desired channel 2701 and a reference signal transmission time point 2720 for an interference channel 2702 may be allowed to be configured differently.

According to an embodiment, by transmitting a reference signal for the desired channel 2702 and a reference signal for the interference channel 2702 at different time points, more flexibility may be provided to terminal measurement and reporting. In particular, such a method does not need to support reference signal transmission for every possible number of cases, and thus time and frequency resources required for the reference signal transmission may be reduced.

Figure 28:
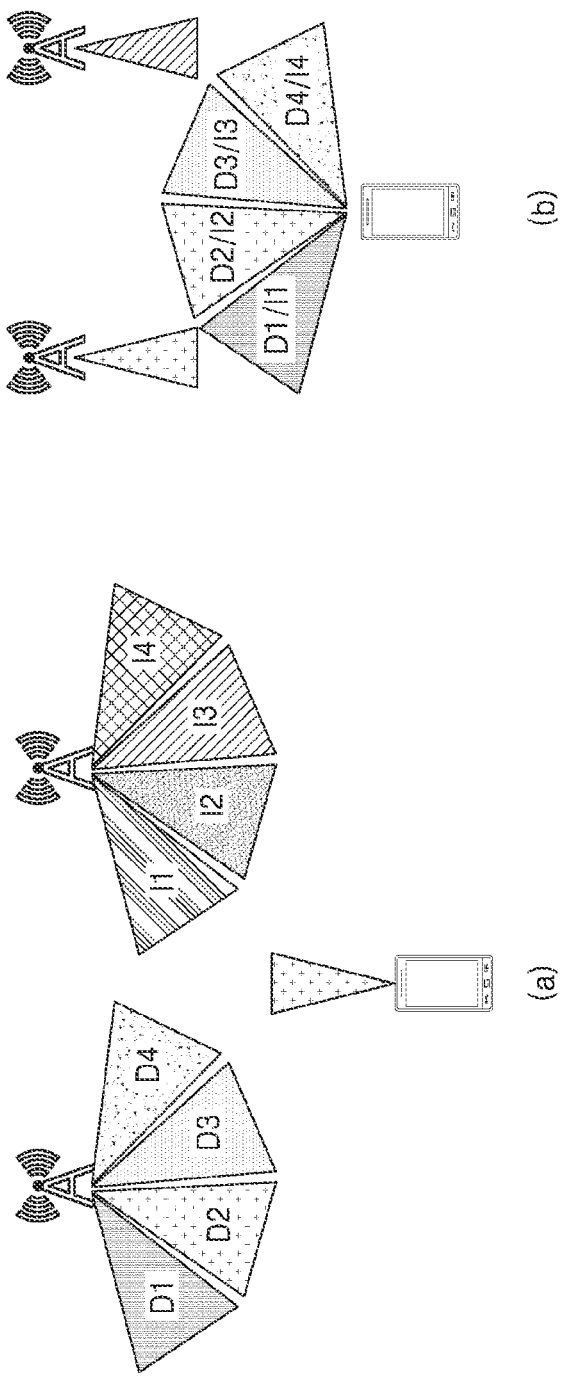
FIG. 28 is a diagram for describing measurement and reports for beam cooperation of a terminal based on transmission at different time points, according to an embodiment.

FIG. 28 is a diagram for describing measurement and report for beam cooperation of a terminal based on transmission at different time points, according to an embodiment.

Referring to (a) of FIG. 28, the terminal transmits reference signals at different times points for transmission beams D1 through D4 and I1 through I4. The terminal may calculate an RSRP combination for all beam combinations as represented by Equation 5, by measuring RSRP for each beam by using the reference signals transmitted at different time points.

$$RSRQ_1 = D_1/I_1, RSRQ_2 = D_1/I_2, \ldots, RSRQ_N = D_2/I_1, \ldots, RSRQ_M = D_4/P_B \quad \text{Equation 5}$$

According to an embodiment, because the terminal is able to calculate RSRQ of a desired channel and an interference channel via measurement of each reference signal without having to measure reference signal power for all combinations, time and frequency resources required for reference signal transmission may be efficiently used and the terminal may perform reporting considering more combinations.

According to an embodiment, when desired channel and interference channel reference signals are transmitted at different time points during measurement and reporting for beam cooperative communication, reception beams of the terminal used to measure the desired channel and interference channel reference signals may be different from each other. When the reception beams of the terminal used to measure the reference signals are different from each other, it is impossible to accurately calculate RSRQ, BQI, BI, RS-SINR, CSI-RS SINR, or SSB-SINR. Accordingly, it should be ensured that the desired channel reference signal and the interference channel reference signal are measured with the same reception beam.

Referring to (b) of FIG. 28, the desired channel and interference reference signals are measured with the same beam. According to an embodiment, the desired channel and the interference channel reference signals may be configured to be measured with the same beam, and more particularly, the desired channel and interference channel reference signals may be configured to be measured with the same beam to calculate RSRQ, BQI, BI, RS-SINR, CSI-RS SINR, or SSB-SINR or, under an assumption that the terminal applies reception beams in the same order with respect to the repeatedly transmitted transmission beam, when the same transmission beam is repeatedly transmitted, a desired channel resource and interference channel resource transmitted in the same order may be configured to be used to calculate RSRQ, BQI, BI, RS-SINR, CSI-RS SINR, or SSB-SINR. As such, using of the same beam may indicate that the same spatial domain receive filter is used. In addition, the terminal may configure spatial QCL configuration configured in the desired channel and interference channel reference signals to be the same or configure the same beam to be used by sharing one piece of information.

Also, according to an embodiment, during measurement and reporting for beam cooperative communication, when the desired channel reference signal and the interference channel reference signal are transmitted at different time points, a combination of the desired channel and the interference channel needs to be reported to report CRI. Also, a resource indication for channel measurement and a resource indication for interference measurement may be independently supported. For example, like CRI, an interference resource indicator (IRI) may be supported to report a desired channel reference signal resource index and an interference channel reference signal resource index, which are measured with good quality, together, to report good beams for the desired channel and the interference channel to a base station. In addition, IRI may consider high interference instead of low interference to avoid the worst situation, and it is possible to configure, based on RRC, whether corresponding IRI reports an index of a resource showing high interference or reports an index of a resource showing low interference.

According to an embodiment, the base station may report an index of a CSI-RS resource or SSB, where low RSRP is measured, via CRI, based on a CSI-RS or SSB resource for existing channel measurement and beam management, such that a similar effect may be supported by using CRI instead of reporting IRI to the terminal. The base station may receive a resource index having low RSRP and an RSRP value from the terminal to directly calculate RSRQ or BQI and use a result thereof to support beam-based cooperative communication. When two or more CSI-RS ports are configured for calculating the RSRP value, the RSRP value may be desired via a linear average. Here, the number of reported CRIs may be one or more. When a plurality of CRIs are reported, the CRIs may be mapped and reported in an order from a resource where a low RSRP value is measured or from a resource where a high RSRP value is measured.

In addition, a plurality of CSI-RS resource sets may be considered to use CRI and IRI as channel measurement and beam management information. Here, the terminal may report independent CRI for each individual CSI-RS set or report an index of CSI-RS resource for one resource set or a plurality of resource sets where a high or low RSRP value is measured among a configured CSI-RS set or an index of an interference measurement resource set. Here, when the terminal reports the index of the CSI-RS resource set, the number of CSI-IM resource sets or CSI-RS resource sets for corresponding interference measurement may be equal to the number of CSI-RS resource sets for signal measurement like the CRI report described above.

Here, for the base station to configure whether the report for channel measurement and beam management is a report based on high RSRP or a report based on low RSRP, configuration about whether the corresponding report is based on high RSRP or low RSRP may be supported via RRC. Also, such configuration may be included as a part of channel state report configuration (CSI reporting setting). Also, the configuration may also include configuration of RSRP to be reported and the number of CRIs according to the RSRP.

In addition, the configuration about whether the report is based on high RSRP or low RSRP may be dynamically switched via MAC CE or DCI. Here, the base station may toggle existing RRC configuration via MAC CE or DCI or may overwrite existing RRC configuration via a new signal. Accordingly, the base station may dynamically switch and report an assumption when the base station is a desired signal and when the base station is interference to usefully use the assumption for a dynamic point selection (DPS).

Also, it is possible to dynamically switch the CRI and RSRP report numbers described above via DCI or MAC CE. Accordingly, it is possible to flexibly support improving of coverage of an UL channel control signal or obtaining of more information by reducing the size of payload required for a report, based on a radio channel state between the base station and the terminal.

According to an embodiment, a plurality of base stations may share beam-related reference signal resource configuration and desired beam information via an X2 interface for reference signal resource sharing between base stations for beam cooperation. Beam-related reference signal resource configuration information may include cell ID and reference signal transmission resource, a transmission type (periodic, semi-persistent, or aperiodic), a period, a slot offset, and beam/CSI-RS resource repetition. Also, beam information may include usage frequency of a candidate resource that is to be frequently used by the base station for coordination according to a report of the terminal The desired channel beam candidate resource may be indicated for each beam angle (for example 0°, 30°, 60° or so on) or may be indicated for each CSI-RS resource or resource set where a corresponding beam is transmitted (for example, reference signal resource 0, reference signal resource 1, reference signal resource 2, or so on). It is possible to indicate a usage frequency of the base station (very low interference, low interference, moderate interference, high interference, very high interference, or so on) for each beam angle and CSI-RS resource. Also, in addition to a desired channel beam angle, information may be shared for an interference channel as well. Like the desired channel, the interference channel may be indicated for each beam angle (for example 0°, 30°, 60° or so on or in horizontal and vertical direction) or may be indicated for each CSI-RS resource or resource set where a corresponding beam is transmitted (for example, reference signal resource 0, reference signal resource 1, reference signal resource 2, or so on). Such information may be shared for wideband, but may also be shared for each partial bandwidth, bandwidth part, PRB, or RBG. Also, the information may be shared for each DL and UL.

Hereinabove, a method of using RSRQ, BQI, BI, RS-SINR, CSI-RS SINR, or SSB-SINR in the beam cooperative communication has been described, but CQI may also be used for quality measurement, and in this case, RI, PMI, and CQI may be reported together. A detailed reporting operation may be the same as or similar to RSRQ, BQI, BI, RS-SINR, CSI-RS SINR, or SSB-SINR described above. Also, in the present disclosure, DL beam cooperative communication has been described as an example, but the present disclosure may be equally applied to UL, cross-link, and side-link. In the UL or side-link, the terminal may transmit SRS instead of CSI-RS, and for interference measurement, SRS having a plurality of resources may be configured for interference measurement. Also, in the present disclosure, a process by which the terminal measures a reference signal transmitted by the base station to report channel state information and beam management information has been descried, but the base station may measure and use a configured reference signal to directly transmit or recommend data to the terminal.

In addition, for the terminal to report channel state information and beam management information while simultaneously considering UL, cross-link, and side-link channels, NZP CSI-RS, CSI-IM (ZP CSI-RS-based interference measurement), and SRS may be simultaneously considered. For example, by configuring four independent resource sets during channel state information and beam management information reporting, one may be configured for NZP CSI-RS for signal channel state measurement, another one may be configured for NZP CSI-RS for interference channel measurement in a cell, another one may be configured for ZP CSI-RS for inter-cell interference measurement, and another one may be configured for SRS set for UL, cross-link, or side-link interference measurement. In the above example, all four are configured at once, but some of them may be selected and configured. For example, three resource sets may be configured for various combinations, for example, NZP CSI-RS for channel measurement, CSI-IM for interference measurement, and SRS may be configured, or NZP CSI-RS for channel measurement, NZP CSI-RS for interference measurement, and SRS may be configured.

In addition, to support interference measurement considering a plurality of TRPs, a plurality of NZP CSI-RS resource sets for interference measurement may be configured. Current NZP CSI-RS-based interference measurement is based on one resource set and NZP CSI-RS resource such that each port indicate one interference layer. By expanding such resource sets to a plurality of numbers for interference measurement considering the plurality of TRPs, the channel state and beam management information reporting may be supported considering a situation where interference is transmitted from the plurality of TRPs.

As described above, when the plurality of same or different types of interference resources are configured, the terminal may report IRI for each interference set. For example, when NZP CSI-RS and SRS resource sets for interference measurement are configured, by reporting IRS in each set, an independent optimum combination may be supported to be selected for each interference situation.

Such IRI reporting for each resource may be configured via RRC. For example, when the RRC is configured (ON), independent IRI reporting may be supported for all individual resources or an additional bitmap may be provided to configure whether to support RRC individual IRI reporting for each resource set or resource.

Figure 29:
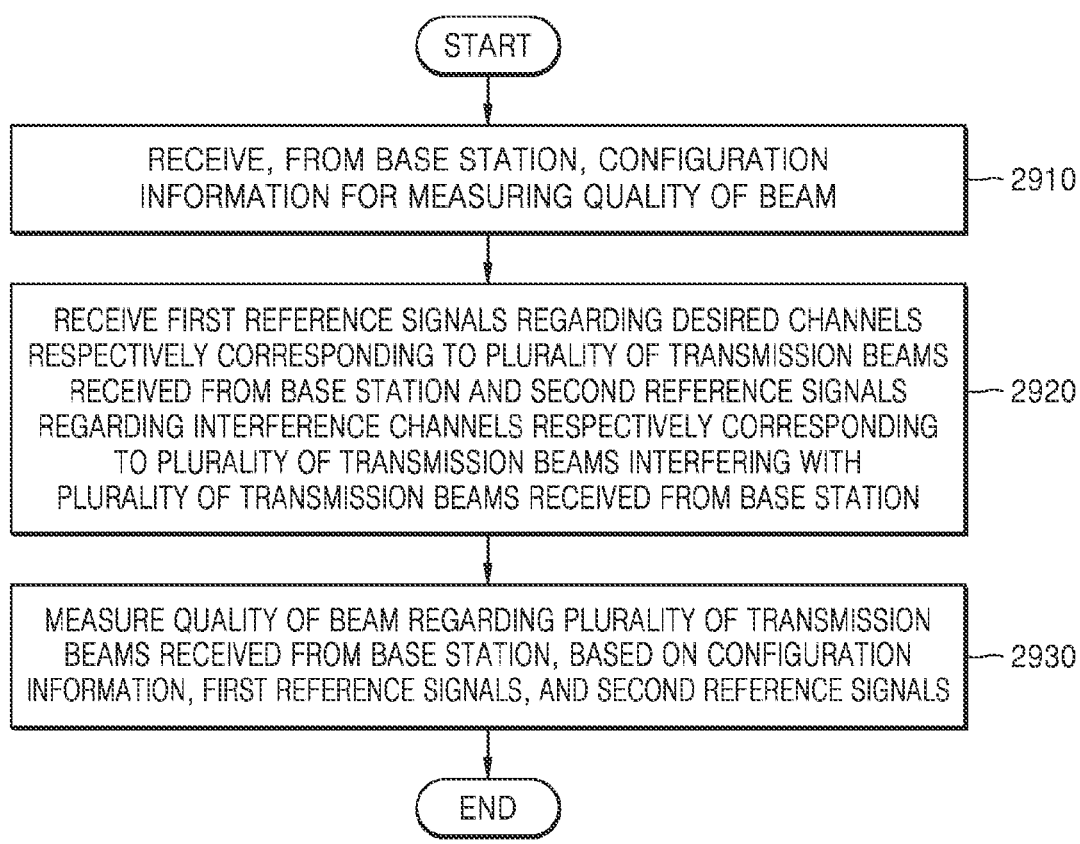
FIG. 29 is a flowchart of an operation of a terminal, according to an embodiment.

FIG. 29 is a flowchart of an operation of a terminal, according to an embodiment.

Referring to FIG. 29, in operation 2910, the terminal receives configuration information for measuring quality of a beam from a base station. According to an embodiment, the configuration information for measuring the quality of the beam may include measurement configuration information and resource configuration information for a reference signal. The measurement configuration information and resource configuration information for the reference signal may include information about the reference signal for channel measurement. For example, a reference signal type, a port number of a reference signal, a codebook type, N1 and N2 that are number of antennas for each dimension, O1 and O2 that are oversampling factors for each dimension, one subframe configuration for transmitting a plurality of CSI-RSs, a plurality of resource configurations for configuring a position, codebook subset restriction-related information, CSI report-related information, a CSI-process index, a candidate number for indicating timing between aperiodic channel state report trigger and aperiodic channel state report, and transmit power information ($P_C$) may be included.

According to an embodiment, the terminal may receive feedback configuration information via channel state report configuration used in measurement configuration. The feedback configuration information may include whether to report PMI/CQI, a period and offset, an RI period and offset, a CRI period and offset, wideband/subband, submode, a channel state report type, and a candidate number for indicating timing between aperiodic channel state report trigger and aperiodic channel state report. Here, the terminal may simultaneously or sequentially receive the configuration information for measuring the quality of the beam and the feedback configuration information.

In operation 2920, the terminal receives first reference signals regarding desired channels respectively corresponding to a plurality of transmission beams received from the base station, and second reference signals regarding interference channels respectively corresponding to a plurality of transmission beams that interfere with the plurality of transmission beams received from the base station. Here, a reference signal may include CSI-RS.

In operation 2930, the terminal measures the quality of the beam regarding the plurality of transmission beams received from the base station, based on the configuration information, the first reference signals regarding the desired channels respectively corresponding to the plurality of transmission beams received from the base station, and the second reference signals regarding the interference channels respectively corresponding to the plurality of transmission beams that interfere with the plurality of transmission beams received from the base station. According to an embodiment, the terminal may estimate the quality of the beam between a transmission antenna of the base station and a reception antenna of the terminal, based on the received first and second reference signals. The terminal may estimate the quality of the beam for each antenna port and estimate the quality of an additional beam regarding virtual resource, based thereon.

According to an embodiment, the terminal may generate feedback information based on the measured quality of the beam and the feedback configuration information. The feedback information may include rank, PMI, and CQI, and an optimum CRI may be selected based thereon. Moreover, the terminal may transmit, to the base station, feedback configuration of the base station or aperiodic channel state report trigger and feedback information determined based on indication of timing between aperiodic channel state report trigger and aperiodic channel state report.

Figure 30:
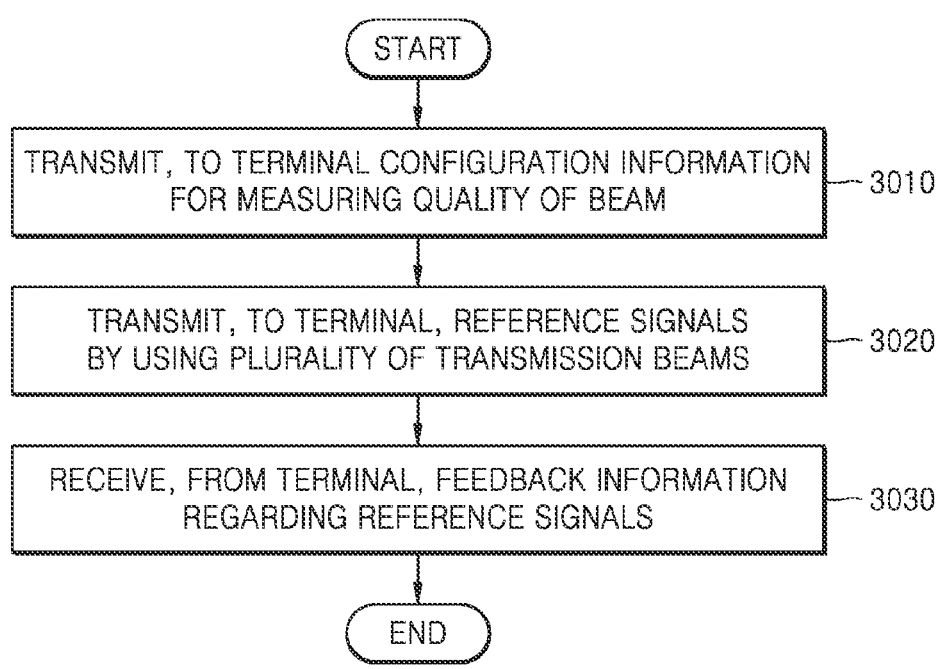
FIG. 30 is a flowchart of an operation of a base station in the present disclosure according an embodiment.

FIG. 30 is a flowchart of an operation of a base station in the present disclosure according an embodiment.

Referring to FIG. 30, in operation 3010, the base station transmits, to a terminal, configuration information for measuring quality of a beam. According to an embodiment, measurement configuration information and resource configuration information for a reference signal may include information about the reference signal for channel measurement. For example, a reference signal type, a port number of a reference signal, a codebook type, N1 and N2 that are number of antennas for each dimension, O1 and O2 that are oversampling factors for each dimension, one subframe configuration for transmitting a plurality of CSI-RSs, a plurality of resource configurations for configuring a position, codebook subset restriction-related information, CSI report-related information, a CSI-process index, a candidate number for indicating timing between aperiodic channel state report trigger and aperiodic channel state report, and transmit power information ($P_C$) may be included.

According to an embodiment, the base station may transmit feedback configuration information to the terminal. The feedback configuration information may include whether to report PMI/CQI, a period and offset, an RI period and offset, a CRI period and offset, wideband/subband, submode, a channel state report type, and a candidate number for indicating timing between aperiodic channel state report trigger and aperiodic channel state report. Here, the terminal may simultaneously or sequentially receive the configuration information for measuring the quality of the beam and the feedback configuration information.

In operation 3020, the base station transmits, to the terminal, reference signals by using a plurality of transmission beams. Here, the reference signal may include CSI-RS.

In operation 3030, the base station receives, from the terminal, feedback information regarding the reference signal. According to an embodiment, the base station may receive the feedback information from the terminal at timing determined via the feedback configuration information and use the feedback information to determine a quality state of the beam between the terminal and the base station.

Figure 31:
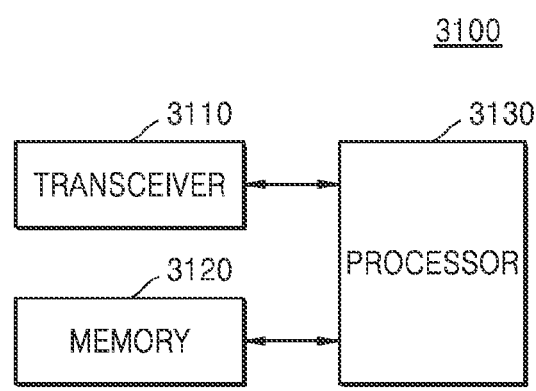
FIG. 31 is a block diagram showing an internal structure of a terminal, according to an embodiment.

FIG. 31 is a block diagram showing an internal structure of a terminal, according to an embodiment.

Referring to the FIG. 31, a terminal 3100 may include a transceiver 3110, a memory 3120, and a processor 3130. The transceiver 3110, the memory 3120, and the processor 3130 of the terminal 3100 may operate according to a communication method of the terminal 3100. However, the components of the terminal 3100 are not limited thereto. For example, the terminal 3100 may include more or fewer components than those described above. In addition, the transceiver 3110, the memory 3120, and the processor 3130 may be implemented as a single chip.

The transceiver 3110 may transmit or receive a signal to or from a base station. Here, the signal may include control information and data. In this regard, the transceiver 3110 may include a RF transmitter for up-converting and amplifying a frequency of a transmitted signal, and a RF receiver for amplifying low-noise and down-converting a frequency of a received signal. However, this is only an embodiment of the transceiver 3110 and components of the transceiver 3110 are not limited to the RF transmitter and the RF receiver.

Also, the transceiver 3110 may receive and output, to the processor 3130, a signal through a radio channel, and transmit a signal output from the processor 3130 through the radio channel.

The memory 3120 may store a program and data required for operations of the terminal 3100. Also, the memory 3120 may store control information or data included in a signal obtained by the terminal 3100. The memory 3120 may be a storage medium, such as ROM, RAM, a hard disk, a CD-ROM, and a DVD, or a combination of storage media. Also, the memory 3120 may be configured in a plurality of memories. According to an embodiment, the memory 3120 may store a program for supporting beam-based cooperative communication.

The processor 3130 may control a series of processes such that the terminal 3100 operates as described above. The processor 3130 may be configured as one or more processors. According to an embodiment, the processor 3130 may execute the program stored in the memory 3120 to receive, from the base station, configuration information for measuring quality of a beam, receive first reference signals regarding desired channels respectively corresponding to a plurality of transmission beams received from the base station and second reference signals regarding interference channels respectively corresponding to a plurality of transmission beams interfering with the plurality of transmission beams received from the base station, and measure the quality of the beam for the plurality of transmission beams received from the base station, based on the configuration information, the first reference signals, and the second reference signals.

Figure 32:
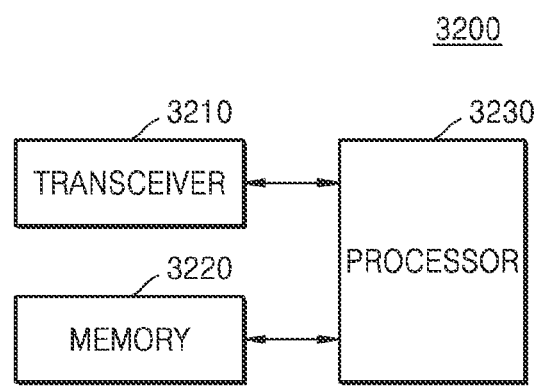
FIG. 32 is a block diagram showing an internal structure of a base station, according to an embodiment.

FIG. 32 is a block diagram showing an internal structure of a base station, according to an embodiment.

Referring to FIG. 32, a base station 3200 may include a transceiver 3210, a memory 3220, and a processor 3230. The transceiver 3210, the memory 3220, and the processor 3230 of the base station 3200 may operate according to a communication method of the base station 3200. However, the components of the base station 3200 are not limited thereto. For example, the base station 3200 may include more or fewer components than those described above. In addition, the transceiver 3210, the memory 3220, and the processor 3230 may be implemented as a single chip.

The transceiver 3210 may transmit or receive a signal to or from a terminal. Here, the signal may include control information and data. In this regard, the transceiver 3210 may include a RF transmitter for up-converting and amplifying a frequency of a transmitted signal, and a RF receiver for amplifying low-noise and down-converting a frequency of a received signal. However, this is only an embodiment of the transceiver 3210 and components of the transceiver 3210 are not limited to the RF transmitter and the RF receiver.

Also, the transceiver 3210 may receive and output, to the processor 3230, a signal through a radio channel, and transmit a signal output from the processor 3230 through the radio channel.

The memory 3220 may store a program and data required for operations of the base station 3200. Also, the memory 3220 may store control information or data included in a signal obtained by the base station 3200. The memory 3220 may be a storage medium, such as ROM, RAM, a hard disk, a CD-ROM, and a DVD, or a combination of storage media. Also, the memory 3220 may be configured in a plurality of memories. According to an embodiment, the memory 3220 may store a program for supporting beam-based cooperative communication.

The processor 3230 may control a series of processes such that the base station 3200 operates as described above. The processor 3230 may execute the program stored in the memory 3220 to receive, from the base station, configuration information for measuring quality of a beam, receive first reference signals regarding desired channels respectively corresponding to a plurality of transmission beams received from the base station and second reference signals regarding interference channels respectively corresponding to a plurality of transmission beams interfering with the plurality of transmission beams received from the base station, and measure the quality of the beam for the plurality of transmission beams received from the base station, based on the configuration information, the first reference signals, and the second reference signals.

Meanwhile, the embodiments of the present disclosure described with reference to the present specification and the drawings are merely illustrative of specific examples to easily facilitate description and understanding of the present disclosure, and are not intended to limit the scope of the present disclosure. In other words, it will be apparent to one of ordinary skill in the art that other modifications based on the technical ideas of the present disclosure are feasible. Also, the embodiments may be combined with each other as required. For example, a portion of one embodiment and a portion of another embodiment of the present disclosure may be combined with each other to enable a base station and a terminal to operate. Also, the embodiments are proposed based on a FDD LTE system, but other modifications based on technical ideas of the embodiments may be implemented on other systems, such as a TDD LTE system, a 5G or NR system, and the like.

The invention claimed is:

1. A method, performed by a terminal, of supporting beam-based cooperative communication, the method comprising:
   receiving, from a base station, configuration information for measuring a beam quality;
   receiving first reference signals regarding desired channels respectively corresponding to a plurality of transmission beams received from the base station, and second reference signals regarding interference channels respectively corresponding to a plurality of transmission beams that interfere with the plurality of transmission beams received from the base station; and
   measuring the beam quality regarding the plurality of transmission beams received from the base station, based on the configuration information, the first reference signals, and the second reference signals,
   wherein in case that the first reference signals and the second reference signals are received at different time points, each of reception strength of the first reference signals and reception strength of the second reference signals is measured and the beam quality regarding the plurality of transmission beams received from the base station is determined based on a combination of the measured signal strengths.

2. The method of claim 1, wherein measuring of the beam quality regarding the plurality of transmission beams received from the base station comprises measuring the beam quality, based on a ratio of reception strength of the first reference signals to reception strength of the second reference signals.

3. The method of claim 1, wherein in case that the first reference signals and the second reference signals are received at the same time point and the number of first reference signals and the number of second reference signals are different, the beam quality regarding the plurality of transmission beams received from the base station is determined based on reception strength of only a received signal or the larger number of reference signal.

4. The method of claim 1, wherein in case that the first reference signals and the second reference signals are received at different time points, the first reference signals and the second reference signals are received using the same reception beam.

5. The method of claim 1, further comprising:
receiving feedback configuration information from the base station;
generating feedback information based on the measured beam quality and the feedback configuration information; and
transmitting the feedback information to the base station.

6. A method, performed by a base station, of supporting beam-based cooperative communication, the method comprising:
transmitting, to a terminal, configuration information for measuring a beam quality;
transmitting, to the terminal, first reference signals regarding desired channels respectively corresponding to a plurality of transmission beams transmitted to the terminal, and second reference signals regarding interference channels respectively corresponding to a plurality of transmission beams that interfere with the plurality of transmission beams transmitted to the terminal; and
receiving, from the terminal, feedback information including the beam quality regarding the plurality of transmission beams transmitted to the terminal,
wherein in case that the first reference signals and the second reference signals are transmitted at different time points, each of reception strength of the first reference signals and reception strength of the second reference signals is measured and the beam quality regarding the plurality of transmission beams received from the base station is determined based on a combination of the measured signal strengths.

7. The method of claim 6, further comprising transmitting, to the terminal, feedback configuration information,
wherein the receiving of the feedback information regarding the reference signals comprises receiving the feedback information based on the feedback configuration information.

8. The method of claim 6, further comprising transmitting and receiving transmission beam-related information to and from a base station that transmits a transmission beam interfering with the plurality of transmission beams transmitted by the base station.

9. A terminal for supporting beam-based cooperative communication, the terminal comprising:
a transceiver;
at least one memory storing a program for supporting beam-based cooperative communication; and
at least one processor configured to execute the program to receive, from a base station, configuration information for measuring a beam quality, receive first reference signals regarding desired channels respectively corresponding to a plurality of transmission beams received from the base station and second reference signals regarding interference channels respectively corresponding to a plurality of transmission beams interfering with the plurality of transmission beams received from the base station, and measuring the beam quality regarding the plurality of transmission beams received from the base station, based on the configuration information, the first reference signals, and the second reference signals,
wherein in case that the first reference signals and the second reference signals are received at different time points, each of reception strength of the first reference signals and reception strength of the second reference signals is measured and the beam quality regarding the plurality of transmission beams received from the base station is determined based on a combination of the measured signal strengths.

10. The terminal of claim 9, wherein the at least one processor is further configured to measure the beam quality, based on a ratio of reception strength of the first reference signals to reception strength of the second reference signals.

11. The terminal of claim 9, wherein in case that the first reference signals and the second reference signals are received at the same time point and the number of first reference signals and the number of second reference signals are different, the beam quality regarding the plurality of transmission beams received from the base station is determined based on reception strength of only a received signal of the larger number of reference signal.

12. A base station for supporting beam-based cooperative communication, the base station comprising:
a transceiver;
at least one memory storing a program for supporting beam-based cooperative communication; and
at least one processor configured to transmit, to a terminal, configuration information for measuring a beam quality, transmit, to the terminal, first reference signals regarding desired channels respectively corresponding to a plurality of transmission beams transmitted to the terminal, and second reference signals regarding interference channels respectively corresponding to a plurality of transmission beams that interfere with the plurality of transmission beams transmitted to the terminal, and receive, from the terminal, feedback information regarding the reference signals,
wherein in case that the first reference signals and the second reference signals are transmitted at different time points, each of reception strength of the first reference signals and reception strength of the second reference signals is measured and the quality of the beam regarding the plurality of transmission beams received from the base station is determined based on a combination of the measured signal strengths.

* * * * *